(12) United States Patent
Rusanovskyy et al.

(10) Patent No.: US 10,979,729 B2
(45) Date of Patent: Apr. 13, 2021

(54) SYSTEMS AND METHODS FOR SIGNALING AND CONSTRAINING A HIGH DYNAMIC RANGE (HDR) VIDEO SYSTEM WITH DYNAMIC METADATA

(71) Applicant: QUALCOMM Incorporated, San Diego, CA (US)

(72) Inventors: Dmytro Rusanovskyy, San Diego, CA (US); Adarsh Krishnan Ramasubramonian, San Diego, CA (US); Joel Sole Rojals, Reus (ES)

(73) Assignee: Qualcomm Incorporated, San Diego, CA (US)

( * ) Notice: Subject to any disclaimer, the term of this patent is extended or adjusted under 35 U.S.C. 154(b) by 169 days.

(21) Appl. No.: 15/826,565

(22) Filed: Nov. 29, 2017

(65) Prior Publication Data

US 2018/0152703 A1 May 31, 2018

Related U.S. Application Data

(60) Provisional application No. 62/428,511, filed on Nov. 30, 2016.

(51) Int. Cl.
*H04N 19/70* (2014.01)
*H04N 19/50* (2014.01)
(Continued)

(52) U.S. Cl.
CPC .............. *H04N 19/50* (2014.11); *H04N 1/64* (2013.01); *H04N 19/12* (2014.11);
(Continued)

(58) Field of Classification Search
CPC ...... H04N 19/50; H04N 19/12; H04N 19/136; H04N 19/17; H04N 19/176; H04N 19/18;
(Continued)

(56) References Cited

U.S. PATENT DOCUMENTS 6,278,435 B1 8/2001 Etheridge et al.
9,942,575 B1 4/2018 Lothian et al.
(Continued)

FOREIGN PATENT DOCUMENTS

WO 2016089093 A1 6/2016

OTHER PUBLICATIONS

Amon P., et al., "File Format for Scalable Video Coding", IEEE Transactions on Circuits and Systems for Video Technology, Institute of Electrical and Electronics Engineers, USA, vol. 17, No. 9, Sep. 1, 2007 (Sep. 1, 2007), pp. 1174-1185, XP011193013.
(Continued)

*Primary Examiner* — Ayman A Abaza
(74) *Attorney, Agent, or Firm* — Polsinelli LLP

(57) ABSTRACT

Provided are methods, apparatus, and computer-readable medium for processing video data using a video coding system that implements ST 2094-10 for modifying the color volume of a video signal. In various implementations, metadata blocks that include color volume transform parameters can be included in an encoded bitstream with an encoded video. Mastering display color volume parameters must also be included in the encoded bitstream when the color volume transform parameters are included in the bitstream. When the mastering display color volume parameters are not also included in the bitstream, all or part of the bitstream is non-conforming.

34 Claims, 12 Drawing Sheets

(51) Int. Cl.
  H04N 1/64      (2006.01)
  H04N 19/17     (2014.01)
  H04N 19/176    (2014.01)
  H04N 19/18     (2014.01)
  H04N 19/186    (2014.01)
  H04N 19/12     (2014.01)
  H04N 19/136    (2014.01)
  H04N 19/46     (2014.01)
  H04N 21/431    (2011.01)
  H04N 19/39     (2014.01)
  H04N 21/47     (2011.01)
  H04N 19/52     (2014.01)

(52) U.S. Cl.
  CPC .......... *H04N 19/136* (2014.11); *H04N 19/17* (2014.11); *H04N 19/176* (2014.11); *H04N 19/18* (2014.11); *H04N 19/186* (2014.11); *H04N 19/46* (2014.11); *H04N 19/70* (2014.11); *H04N 19/39* (2014.11); *H04N 19/52* (2014.11); *H04N 21/4316* (2013.01); *H04N 21/47* (2013.01)

(58) Field of Classification Search
  CPC ...... H04N 19/186; H04N 19/46; H04N 19/70; H04N 1/64; H04N 19/39; H04N 19/52; H04N 21/4316
  USPC .................................................... 375/240.26
  See application file for complete search history.

(56) References Cited

U.S. PATENT DOCUMENTS

| | | |
|---|---|---|
| 2001/0048481 A1 | 12/2001 | Hatano et al. |
| 2005/0248783 A1 | 11/2005 | Tin |
| 2015/0201199 A1 | 7/2015 | Gu et al. |
| 2017/0085887 A1* | 3/2017 | Rosewarne .............. H04N 9/67 |
| 2018/0007363 A1* | 1/2018 | Oh ......................... H04N 19/10 |
| 2018/0152703 A1 | 5/2018 | Rusanovskyy et al. |
| 2018/0152721 A1 | 5/2018 | Rusanovskyy et al. |
| 2018/0242006 A1* | 8/2018 | Kerofsky ............... H04N 19/70 |
| 2018/0352260 A1* | 12/2018 | Ishida .................... H04N 19/70 |
| 2018/0359507 A1 | 12/2018 | Oh et al. |
| 2018/0376180 A1 | 12/2018 | Ramalingam |
| 2019/0075325 A1* | 3/2019 | Hwang ............ H04N 21/23614 |

OTHER PUBLICATIONS

Francois E, et al., "AHG14: Suggested Draft Text for HDR/WCG Technology for SDR Backward Compatibility, Display Adaptation, and Quality Enhancement Processing", 25. JCT-VC Meeting; Oct. 14, 2016-Oct. 21, 2016; Chengdu; (Joint Collaborative Team on Video Coding of ISO/IEC JTC1/SC29/WG11 and ITU-T SG.16); URL: http://wftp3.itu.int/av-arch/jctvc-site/ , No. JCTVC-Y0029, Oct. 5, 2016 (Oct. 5, 2016), XP030118070, pp. 1-17.
International Search Report and Written Opinion—PCT/US2017/064054—ISA/EPO—dated Feb. 21, 2018.
Stessen J., et al., "Chromaticity Based Color Signals for Wide Color Gamut and High Dynamic Range", 110. MPEG Meeting; Oct. 20, 2014-Oct. 24, 2014; Strasbourg; (Motion Picture Expert Group or ISO/IEC JTC1/SC29/WG11), Oct. 1, 2014 (Oct. 1, 2014), 18 pages, XP055273234, the whole document.
Tourapis A.M., et al., "Report on the XYZ/HDR Exploratory Experiment 1 (EE1): Electro-Optical Transfer Functions for XYZ/HDR Delivery", 109. MPEG Meeting; Jul. 7, 2014-Jul. 11, 2014; Sapporo; (Motion Picture Expert Group or ISO/IEC JTC1/SC29/WG11), No. m34165, Jul. 2, 2014 (Jul. 2, 2014), 20 pages, XP030062538, the whole document.
CTA Technology & Standard Department: "A DTV Profile for Uncompressed High Speed Digital Interfaces", CTA-861-G, Dynamic Range and Mastering InfoFrame Errata, Jul. 19, 2018, 221 Pages.

* cited by examiner

900

┌─────────────────────────────────────────┐
│ Receiving the video data, wherein the video data is │
│ associated with a color volume │
│ 902 │
└─────────────────────────────────────────┘
                    ↓
┌─────────────────────────────────────────┐
│ Obtaining a set of color volume transform parameters from │
│ the video data, wherein the set of color volume transform │
│ parameters can be used to transform the color volume │
│ 904 │
└─────────────────────────────────────────┘
                    ↓
┌─────────────────────────────────────────┐
│ Obtaining a set of mastering display color volume │
│ parameters, wherein the set of mastering display color │
│ volume parameters includes values determined when │
│ generating a master copy of the video data │
│ 906 │
└─────────────────────────────────────────┘
                    ↓
┌─────────────────────────────────────────┐
│ Generating one or more metadata blocks for the set of color │
│ volume transform parameters │
│ 908 │
└─────────────────────────────────────────┘
                    ↓
┌─────────────────────────────────────────┐
│ Generating one or more additional metadata blocks for the │
│ set of mastering display color volume parameters │
│ 910 │
└─────────────────────────────────────────┘
                    ↓
┌─────────────────────────────────────────┐
│ Generating an encoded bitstream for the video data, wherein │
│ the encoded bitstream includes the one or more metadata │
│ blocks and the one or more additional metadata blocks, │
│ wherein inclusion of the one or more additional metadata │
│ blocks is required by presence of the one or more metadata │
│ blocks in the encoded bitstream │
│ 912 │
└─────────────────────────────────────────┘

FIG. 9

SYSTEMS AND METHODS FOR SIGNALING AND CONSTRAINING A HIGH DYNAMIC RANGE (HDR) VIDEO SYSTEM WITH DYNAMIC METADATA

CROSS-REFERENCES TO RELATED APPLICATIONS

This application claims priority to U.S. Provisional Application No. 62/428,511, filed on Nov. 30, 2016, and incorporated by reference herein in its entirety.

FIELD

This application is related to video systems and methods. More specifically, this application relates to systems and methods for organizing and managing a High Dynamic Range (HDR) Video System with dynamic metadata (e.g., ST 2094-10). These systems and methods are applicable for digital video broadcasting or Over-The-Top video systems that support signaling of UHD and HDR/WCG video signals, or any other suitable video system.

BACKGROUND

Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification is available as "Recommendation ITU-T H.265: High Efficiency Video Coding (HEVC)," www.itu.int/rec/T-REC-H.265-201504-I/en.

Following the decoding process, uncompressed video signal is signaled through a high-speed digital physical interface to an end consumer device, such as a display or a TV. Protocols, requirements, and recommendations for the utilization of uncompressed digital interfaces by consumer electronics devices such as Digital Televisions (DTVs), digital cable, satellite or terrestrial set-top boxes (STBs), and related peripheral devices including, but not limited to DVD players/recorders, and other related Sources or Sinks are specified in CTA-861 specification. A recent version of the Specification is available at standards.cta.tech/kwspub/published_docs/ANSI-CTA-861-F-Preview.pdf.

BRIEF SUMMARY

In various implementations, provided are systems and methods for encoding color volume transform parameters defined by ST 2094-10 into a bitstream. A video can be captured with a large color volume, including a large dynamic range of colors and a wide color gamut. Video captured in this manner attempts to capture the range and depth of colors that can be perceived by human vision. A display device, however, may not be able to display a large color volume. Thus, standards such as ST 2094-10 define parameters for conducting color volume transforms, which can be used to compress a color volume into a more compact form.

Provided are techniques that enable a video coding system to use the parameters defined by ST 2094-10. According to at least one example, a method of processing video data is provided that includes receiving the video data, wherein the video data includes at least two video signals. The method further includes obtaining one or more sets of color volume transform parameters from the video data. The method further includes determining a display region for each of the at least two video signals, wherein the display region determines a portion of a video frame in which the at least two video signals will be displayed. The method further includes determining, for each of the at least two video signals, an association between a video signal among the at least two video signals and a set of color volume transform parameters among the one or more sets of color volume transform parameters, wherein the set of color volume transform parameters determine one or more display parameters for a display region for the video signal. The method further includes generating a one or more metadata blocks for the one or more sets of color volume transform parameters. The method further includes generating an encoded bitstream for the video data, wherein the encoded bitstream includes the one or more metadata blocks. The method further includes encoding, in the encoded bitstream, the determined association between the at least two video signals and the one or more sets of color volume parameters.

In another example, an apparatus is provided that includes a memory configured to store video data including at least two video signals and a processor. The processor is configured to and can obtain one or more sets of color volume transform parameters from the video data. The processor is configured to and can determine a display region for each of the at least two video signals, wherein the display region determines a portion of a video frame in which the at least two video signals will be displayed. The processor is configured to and can determine, for each of the at least two video signals, a respective association between a video signal among the at least two video signals and a set of color volume transform parameters among the one or more sets of color volume transform parameters, wherein the set of color volume transform parameters determine one or more display parameters for a display region for the video signal. The processor is configured to and can generate a one or more metadata blocks for the one or more sets of color volume transform parameters. The processor is configured to and can generate an encoded bitstream for the video data, wherein the encoded bitstream includes the one or more metadata blocks. The processor is configured to and can encode, in the encoded bitstream, the determined respective associations between the at least two video signals and the one or more sets of color volume parameters.

In another example, a computer readable medium is provided having stored thereon instructions that when executed by a processor perform a method that includes: receiving the video data, wherein the video data includes at least two video signals. The method further includes obtaining one or more sets of color volume transform parameters from the video data. The method further includes determining a display region for each of the at least two video signals, wherein the display region determines a portion of a video frame in which the at least two video signals will be displayed. The method further includes determining, for each of the at least two video signals, a respective association between a video signal among the at least two video signals and a set of color volume transform parameters among the one or more sets of color volume transform parameters, wherein the set of color volume transform parameters determine one or more display parameters for a display region for the video signal. The method further includes generating a one or more metadata blocks for the one or more sets of color volume transform parameters. The method further includes generating an encoded bitstream for the video data, wherein the encoded bitstream includes the one or more metadata blocks. The method further includes encoding, in the encoded bitstream, the determined respective associations between the at least two video signals and the one or more sets of color volume parameters.

In another example, an apparatus is provided that includes means for receiving the video data, wherein the video data includes at least two video signals. The apparatus further comprises means for obtaining one or more sets of color volume transform parameters from the video data. The apparatus further comprises means for determining a display region for each of the at least two video signals, wherein the display region determines a portion of a video frame in which the at least two video signals will be displayed. The apparatus further comprises means for determining, for each of the at least two video signals, a respective association between a video signal among the at least two video signals and a set of color volume transform parameters among the one or more sets of color volume transform parameters, wherein the set of color volume transform parameters determine one or more display parameters for a display region for the video signal. The apparatus further comprises means for generating a one or more metadata blocks for the one or more sets of color volume transform parameters. The apparatus further comprises means for generating an encoded bitstream for the video data, wherein the encoded bitstream includes the one or more metadata blocks. The apparatus further comprises means for encoding, in the encoded bitstream, the determined respective associations between the at least two video signals and the one or more sets of color volume parameters.

In some aspects, encoding the determined respective associations between the at least two video signals and the one or more sets of color volume parameters includes placing the one or more metadata blocks in the encoded bitstream according to an order of the display regions within the video frame.

In some aspects, encoding the determined respective associations between the at least two video signals and the one or more sets of color volume parameters includes inserting one or more values into the encoded bitstream that each indicate the determined respective associations.

In some aspects, a first display region for a first video signal among the at least two video signals overlaps with a second display region for a second video signal among the at least two video signals, and wherein a set of color volume transform parameters among the one or more sets of color volume transform parameters to use in the overlapping region is determined by a priority between the first display region and the second display region. In some aspects, the priority is based on an order in which the first display region and the second display region are displayed in the video frame. In some aspects, the priority is based on a value provided by the video data.

In some aspects, the one or more metadata blocks are encoded in one or more Supplemental Enhancement Information (SEI) Network Abstraction Layer (NAL) unit.

According to at least one example, a method of processing video data is provided that includes receiving an encoded bitstream, wherein the encoded bitstream includes at least two encoded video signals and one or more metadata blocks that include one or more sets of color volume transform parameters. The method further includes determining a display region for each of the at least encoded two video signals. The method further includes determining, for each of the at least two video signals, an association between a video signal among the at least two video signals and a set of color volume transform parameters among the one or more sets of color volume transform parameters. The method further includes decoding the at least two encoded video signals using an associated set of color volume transform parameters, wherein the associated set of color volume transform parameters determine one or more display parameters for a corresponding display region.

In another example, an apparatus is provided that includes a memory configured to store video data and a processor. The processor is configured to and can receive an encoded bitstream, wherein the encoded bitstream includes at least two encoded video signals and one or more metadata blocks that include one or more sets of color volume transform parameters. The processor is configured to and can determine a display region for each of the at least encoded two video signals. The processor is configured to and can determine, for each of the at least two encoded video signals, an association between a video signal among the at least two encoded video signals and a set of color volume transform parameters among the one or more sets of color volume transform parameters. The processor is configured to and can decode the at least two encoded video signals using an associated set of color volume transform parameters, wherein the associated set of color volume transform parameters determine one or more display parameters for a corresponding display region.

In another example, a computer readable medium is provided having stored thereon instructions that when executed by a processor perform a method that includes: receiving an encoded bitstream, wherein the encoded bitstream includes at least two encoded video signals and one or more metadata blocks that include one or more sets of color volume transform parameters. The method further includes determining a display region for each of the at least encoded two video signals. The method further includes determining, for each of the at least two video signals, an association between a video signal among the at least two video signals and a set of color volume transform parameters among the one or more sets of color volume transform parameters. The method further includes decoding the at least two encoded video signals using an associated set of color volume transform parameters, wherein the associated set of color volume transform parameters determine one or more display parameters for a corresponding display region.

In another example, an apparatus is provided that includes means for receiving an encoded bitstream, wherein the encoded bitstream includes at least two encoded video signals and one or more metadata blocks that include one or more sets of color volume transform parameters. The apparatus further comprises means for determining a display region for each of the at least encoded two video signals. The apparatus further comprises means for determining, for each of the at least encoded two video signals, an association between a video signal among the at least two encoded video signals and a set of color volume transform parameters among the one or more sets of color volume transform parameters. The apparatus further comprises means for decoding the at least two encoded video signals using an associated set of color volume transform parameters, wherein the associated set of color volume transform parameters determine one or more display parameters for a corresponding display region.

In some aspects, associations between the at least two video signals and the one or more set of color volume transform parameters is based on an order of the display regions.

In some aspects, associations between the at least two video signals and the one or more set of color volume transform parameters is based on one or more values included in the encoded bitstream.

In some aspects, a first display region for a first video signal among the at least two video signals overlaps with a second display region for a second video signal among the at least two video signals, and wherein a set of color volume transform parameters among the one or more sets of color volume transform parameters to use in the overlapping region is determined by a priority between the first display region and the second display region. In some aspects, the priority is based on an order in which the first display region and the second display region are displayed in the video frame. In some aspects, the priority is based on a value provided by the video data.

In some aspects, the one or more metadata blocks are encoded in one or more Supplemental Enhancement Information (SEI) Network Abstraction Layer (NAL) unit.

According to at least one example, a method of processing video data is provided that includes receiving the video data, wherein the video data is associated with a color volume. The method further includes obtaining a set of color volume transform parameters from the video data, wherein the set of color volume transform parameters can be used to transform the color volume. The method further includes obtaining a set of mastering display color volume parameters, wherein the set of mastering display color volume parameters includes values determined when generating a master copy of the video data. The method further includes generating one or more metadata blocks for the set of color volume transform parameters. The method further includes generating one or more additional metadata blocks for the set of mastering display color volume parameters. The method further includes generating an encoded bitstream for the video data, wherein the encoded bitstream includes the one or more metadata blocks and the one or more additional metadata blocks, wherein inclusion of the one or more additional metadata blocks is required by presence of the one or more metadata blocks in the encoded bitstream.

In another example, an apparatus is provided that includes a memory configured to store video data that includes a color volume and a processor. The processor is configured to and can obtain a set of color volume transform parameters from the video data, wherein the set of color volume transform parameters can be used to transform the color volume. The processor is configured to and can obtain a set of mastering display color volume parameters, wherein the set of mastering display color volume parameters includes values determined when generating a master copy of the video data. The processor is configured to and can generate one or more metadata blocks for the set of color volume transform parameters. The processor is configured to and can generate one or more additional metadata blocks for the set of mastering display color volume parameters. The processor is configured to and can generate an encoded bitstream for the video data, wherein the encoded bitstream includes the one or more metadata blocks and the one or more additional metadata blocks, wherein inclusion of the one or more additional metadata blocks is required by presence of the one or more metadata blocks in the encoded bitstream.

In another example, a computer readable medium is provided having stored thereon instructions that when executed by a processor perform a method that includes: receiving the video data, wherein the video data includes a color volume. The method further includes obtaining a set of color volume transform parameters from the video data, wherein the set of color volume transform parameters can be used to transform the color volume. The method further includes obtaining a set of mastering display color volume parameters, wherein the set of mastering display color volume parameters includes values determined when generating a master copy of the video data. The method further includes generating one or more metadata blocks for the set of color volume transform parameters. The method further includes generating one or more additional metadata blocks for the set of mastering display color volume parameters. The method further includes generating an encoded bitstream for the video data, wherein the encoded bitstream includes the one or more metadata blocks and the one or more additional metadata blocks, wherein inclusion of the one or more additional metadata blocks is required by presence of the one or more metadata blocks in the encoded bitstream.

In another example, an apparatus is provided that includes means for receiving the video data, wherein the video data includes a color volume. The apparatus further comprises means for obtaining a set of color volume transform parameters from the video data, wherein the set of color volume transform parameters can be used to transform the color volume. The apparatus further comprises means for obtaining a set of mastering display color volume parameters, wherein the set of mastering display color volume parameters includes values determined when generating a master copy of the video data. The apparatus further comprises means for generating one or more metadata blocks for the set of color volume transform parameters. The apparatus further comprises means for generating one or more additional metadata blocks for the set of mastering display color volume parameters. The apparatus further comprises means for generating an encoded bitstream for the video data, wherein the encoded bitstream includes the one or more metadata blocks and the one or more additional metadata blocks, wherein inclusion of the one or more additional metadata blocks is required by presence of the one or more metadata blocks in the encoded bitstream.

In some aspects, the set of color volume transform parameters includes a transfer characteristic, and wherein, in the encoded bitstream, the one or more metadata blocks excluded when the transfer characteristic does not correspond to a particular value In some aspects, the set of color volume transform parameters and the set of mastering display color volume parameters include a same field, and wherein the field is omitted from the one or more metadata blocks based on the field being present in the one or more additional metadata blocks.

In some aspects, the video data includes a plurality of processing windows, and wherein, in the encoded bitstream, a quantity of the plurality of processing windows is constrained to a value between one and sixteen.

In some aspects, the video data includes a plurality of content description elements, and wherein, in the encoded bitstream, a quantity of the plurality of content description elements is constrained to one.

In some aspects, the video data includes a plurality of target display elements, and wherein, in the encoded bitstream, a quantity of the plurality of target display elements is constrained to a value between one and sixteen In some aspects, the encoded bitstream includes at least one metadata block for each access unit in the encoded bitstream, the metadata block including color volume transform parameters.

In some aspects, values defined as reserved are excluded from the encoded bitstream.

In some aspects, the one or more metadata blocks each include a length value, and wherein, in the encoded bitstream, the length value is constrained to a multiple of eight.

In some aspects, the one or more metadata blocks each include a length value, and wherein, in the encoded bitstream, the length value is constrained to a value between 0 and 255.

In some aspects, the one or more metadata blocks are encoded in one or more Supplemental Enhancement Information (SEI) Network Abstraction Layer (NAL) unit In some aspects, the one or more additional metadata blocks are encoded in one or more Supplemental Enhancement Information (SEI) Network Abstraction Layer (NAL) unit.

According to at least one example, a method of processing video data is provided that includes receiving an encoded bitstream, wherein the encoded bitstream includes one or more metadata blocks that include a set of encoded color volume transform parameters. The method further includes determining a presence of the one or more metadata blocks in the encoded bitstream. The method further includes, based on the determination of the presence of the one or more metadata blocks in the encoded bitstream, determining that a presence of one or more additional blocks is required in the encoded bitstream. The method further includes determining that the encoded bitstream does not include the one or more additional metadata blocks that include an encoded set of mastering display color volume parameters. The method further includes determining, based on the encoded bitstream not including the one or more additional metadata blocks, that the encoded bitstream does not conform to the requirement. The method further includes not processing at least a part of the encoded bitstream based on the determination that the encoded bitstream does not conform with the requirement.

In another example, an apparatus is provided that includes a memory configured to store video data and a processor. The processor is configured to and can receive an encoded bitstream, wherein the encoded bitstream includes one or more metadata blocks that include a set of encoded color volume transform parameters. The processor is configured to and can determine a presence of the one or more metadata blocks in the encoded bitstream. The processor is configured to and can, based on the determination of the presence of the one or more metadata blocks in the encoded bitstream, determine that a presence of one or more additional blocks is required in the encoded bitstream. The processor is configured to and can determine that the encoded bitstream does not include the one or more additional metadata blocks that include an encoded set of mastering display color volume parameters. The processor is configured to and can determine, based on the encoded bitstream not including the one or more additional metadata blocks, that the encoded bitstream does not conform to the requirement. The processor is configured to and can not process at least a part of the encoded bitstream based on the determination that the encoded bitstream does not conform with the requirement In another example, a computer readable medium is provided having stored thereon instructions that when executed by a processor perform a method that includes: receiving an encoded bitstream, wherein the encoded bitstream includes one or more metadata blocks that include a set of encoded color volume transform parameters. The method further includes determining a presence of the one or more metadata blocks in the encoded bitstream. The method further includes, based on the determination of the presence of the one or more metadata blocks in the encoded bitstream, determining that a presence of one or more additional blocks is required in the encoded bitstream. The method further includes determining that the encoded bitstream does not include the one or more additional metadata blocks that include an encoded set of mastering display color volume parameters. The method further includes determining, based on the encoded bitstream not including the one or more additional metadata blocks, that the encoded bitstream does not conform to the requirement. The method further includes not processing at least a part of the encoded bitstream based on the determination that the encoded bitstream does not conform with the requirement.

In another example, an apparatus is provided that includes means for receiving an encoded bitstream, wherein the encoded bitstream includes one or more metadata blocks that include a set of encoded color volume transform parameters. The apparatus further comprises means for determining a presence of the one or more metadata blocks in the encoded bitstream. The apparatus further comprises means for, based on the determination of the presence of the one or more metadata blocks in the encoded bitstream, determining that a presence of one or more additional blocks is required in the encoded bitstream. The apparatus further comprises means for determining that the encoded bitstream does not include the one or more additional metadata blocks that include an encoded set of mastering display color volume parameters. The apparatus further comprises means for determining, based on the encoded bitstream not including the one or more additional metadata blocks, that the encoded bitstream does not conform to the requirement. The apparatus further comprises means for not processing at least a part of the encoded bitstream based on the determination that the encoded bitstream does not conform with the requirement.

In some aspects, the encoded set of color volume transform parameters include a transfer characteristic. In these aspects, the methods, apparatuses, and computer readable medium described above further comprise determining that a value of the transfer characteristic is a particular value. In these aspects, determining that the encoded bitstream is non-conforming is further based on the one or more metadata blocks being included in the encoded bitstream when the value of the transfer characteristic is the particular value.

In some aspects, the encoded set of color volume transform parameters and the encoded the set of mastering display color volume parameters include a same field, and wherein determining that the encoded bitstream is non-conforming is further based on the field being present in both the one or more metadata blocks and the one or more additional metadata blocks.

In some aspects, the encoded set of color volume transform parameters and the encoded the set of mastering display color volume parameters include a same field, wherein the field is omitted from the one or more metadata blocks. In these aspects, the methods, apparatuses, and computer readable medium described above further comprise decoding the set of color volume parameters, wherein decoding includes using a value for the field from the encoded set of mastering display color volume parameters.

In some aspects, the video data includes a plurality of processing windows, and wherein determining that the encoded bitstream is non-conforming is further based on a quantity of the plurality of processing windows being greater than sixteen.

In some aspects, the video data includes a plurality of content description elements, and wherein determining that the encoded bitstream is non-conforming is further based on a quantity of the plurality of content description elements being greater than one.

In some aspects, the video data includes a plurality target display elements, and wherein determining that the encoded bitstream is non-conforming is further based on a quantity of the plurality of target display elements being greater than sixteen.

In some aspects, the methods, apparatuses, and computer readable medium described above further comprise determining that the encoded bitstream does not include a metadata block for a particular access unit in the encoded bitstream, wherein determining that the encoded bitstream is non-conforming is further based the encoded bitstream not including a metadata block for the particular access unit.

In some aspects, the methods, apparatuses, and computer readable medium described above further comprise determining that the encoded bitstream includes a reserved value, wherein determining that the encoded bitstream is non-conforming is further based on the encoded bitstream including a reserved value.

In some aspects, the one or more metadata blocks each include a length value, and determining that the encoded bitstream is non-conforming is further based on the length value not being a multiple of eight.

In some aspects, the one or more metadata blocks each include a length value, and wherein and determining that the encoded bitstream is non-conforming is further based on the length value being greater than 255.

In some aspects, the one or more metadata blocks are encoded in one or more Supplemental Enhancement Information (SEI) Network Abstraction Layer (NAL) unit.

In some aspects, the one or more additional metadata blocks are encoded in one or more Supplemental Enhancement Information (SEI) Network Abstraction Layer (NAL) unit.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the of various implementations are described in detail below with reference to the following drawing figures:

FIG. 9 is an example of a process for processing video data.

DETAILED DESCRIPTION

Figure 1:
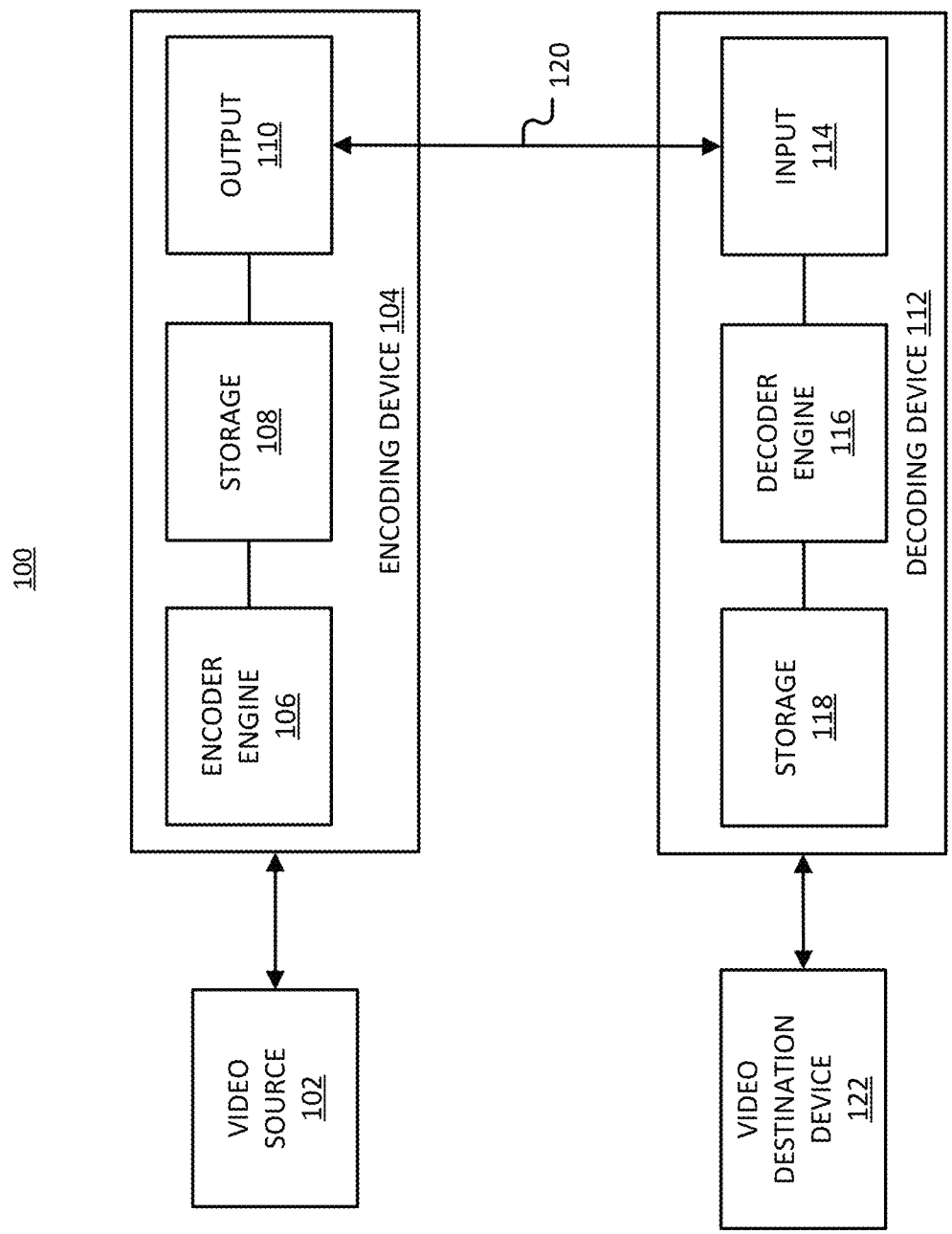
FIG. 1 is a block diagram illustrating an example of a video coding system including an encoding device 104 and a decoding device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality. As used herein, "coding" refers to "encoding" and "decoding."

FIG. 1 is a block diagram illustrating an example of a video coding system 100 including an encoding device 104 and a decoding device 112. In some examples, the video coding system 100 can be a High-Dynamic Range (HDR) system, such that the encoding device 100 can receive HDR video signals and can produce a bitstream for the HDR video signals, and the decoding device 112 can decode the bitstream into HDR video signal that can be output. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many examples described herein provide examples using the JEM model, the HEVC standard, and/or extensions thereof. However, the techniques and systems described herein may also be applicable to other coding standards, such as AVC, MPEG, extensions thereof, or other suitable coding standards that currently exist or future coding standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time.

Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 11. An example of specific details of the decoding device 112 is described below with reference to FIG. 12.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

Various standards have also been defined that describe the colors in a captured video, including the contrast ratio (e.g., the brightness or darkness of pixels in the video) and the color accuracy, among other things. Color parameters can be used, for example, by a display device that is able to use the color parameters to determine how to display the pixels in the video. One example standard from the International Telecommunication Union (ITU), ITU-R Recommendation BT.709 (referred to herein as "BT.709"), defines a standard for High-Definition Television (HDTV). Color parameters defined by BT.709 are usually referred to as Standard Dynamic Range (SDR) and standard color gamut. Another example standard is ITU-R Recommendation BT.2020 (referred to herein as "BT.2020"), which defines a standard for Ultra-High-Definition Television (UHDTV). The color parameters defined by BT.2020 are commonly referred to as High Dynamic Range (HDR) and Wide Color Gamut (WCG). Dynamic range and color gamut are referred to herein collectively as color volume.

Display devices may not be able to display the color volume of a video signal that uses a high dynamic range and wide color gamut. For example, an HDR video signal can have an absolute brightness value for each pixel. In broad daylight, the video signal can include some samples equal to 10,000 candelas per square meter ($cd/m^2$, frequently referred to as a "nit"). A typical High Definition Imaging (HDI) display, however, may only be capable of displaying 1000 nits, while professional studio displays may be capable of displaying 4000 nits.

To enable various different types of display devices to display HDR video signals and other video signals with large color volumes, standards have been defined for color volume transforms. Color volume transforms can be used to transform an input dynamic range and color gamut to an output dynamic range and color gamut that can be displayed by a display device. Examples of color volume transform standards include a suite of standards defined by the Society of Motion Picture Television Engineers (SMPTE), ST 2094. Within the ST 2094 suite, four documents, ST 2094-10, ST 2094-20, ST 2094-30, and ST 2094-40, define metadata that can be used in color volume transforms. Other applicable standards include, for example, SMTPE ST 2084, which provides a transfer function that allows for the display of HDR video content with a luminance level of up to 10,000 nits, and can be used with the color space defined by BT.2020. Another example of an applicable standard is SMTPE 2086, which specifies the metadata items to specify the color volume (the color primaries, white point, and luminance range) of the display that was used in mastering video content.

Among the aforementioned standards, ST 2094-10 specifies content-dependent color volume transform metadata, a specialized model of the generalized color volume transform defined by ST 2094. This color volume transform is based on a parametrically-defined tone mapping curve, the shape of which is defined both by the image essence characteristics (algorithmically computed from the input image essence) and possibly also by manually-set adjustments. This metadata is generated as a part of the mastering process, that is, the production of a master copy to be used for producing copies for distribution. The adjustment parameters can be decided on as a creative adjustment.

The color volume transform parameters defined by ST 2094-10 are provided as abstract, floating point values. To deliver these parameters to a decoder, a format that provides these parameters in a more compact and efficient format is needed. Greater efficiency can be measured, for example, in terms of bits required to represent the values and/or the computational complexity needed to determine and/or use the values. ST 2094-10, however, does not define a format for encoding color volume format parameters into a bitstream.

In various implementations, provided are systems and methods for encoding color volume transform parameters defined by ST 2094-10 into a bitstream. In some examples, a set of color volume transform parameters can be provided with video data. Additionally, a set of mastering display color volume parameters can be provided. The mastering display color volume parameters include values determined when generating a master copy of the video data. In some implementations, the color volume transform parameters can be encoded into a bitstream, along with the video data. In these implementations, the mastering display color volume parameters are required to also be encoded into the bitstream.

In some examples, video data can include two or more video signals, where each video signal can be displayed in a separate display region within the display area of a display device. In these examples, the video data can include sets of color volume transform parameters for the two or more video signals. In some implementations, an encoder can determine an association between a set of color volume transform parameters and a display region for a video signal. The association can be encoded into the bitstream, along with the video data.

The preceding examples can be used to implement an HDR video system, including an encoding device for producing an encoded bitstream and/or a decoding device for decoding a bitstream and formatting the decoded video for display. By defining various constraints on the parameters provided by ST 2094-10, an unambiguous definition of these parameters can be provided, which can simplify the implementation of HDR video systems.

Video standards that define larger color volumes attempt to more closely replicate what the human eye is capable of seeing. As noted above, color volume can include a dynamic range and a color gamut, where dynamic range and color gamut are independent attributes of video content.

Dynamic range can be defined as the ratio between the minimum and maximum brightness of a video signal. Dynamic range can also be measured in terms of f-stops. In cameras, an f-stop is the ratio of the focal length of a lens to the diameter of camera's aperture. One f-stop can correspond to a doubling of the dynamic range of a video signal. As an example, MPEG defines HDR content as content that features brightness variations of more than 16 f-stops. In some examples, a dynamic range between 10 to 16 f-stops is considered an intermediate dynamic range, though in other examples this is considered a HDR dynamic range.

Figure 2:
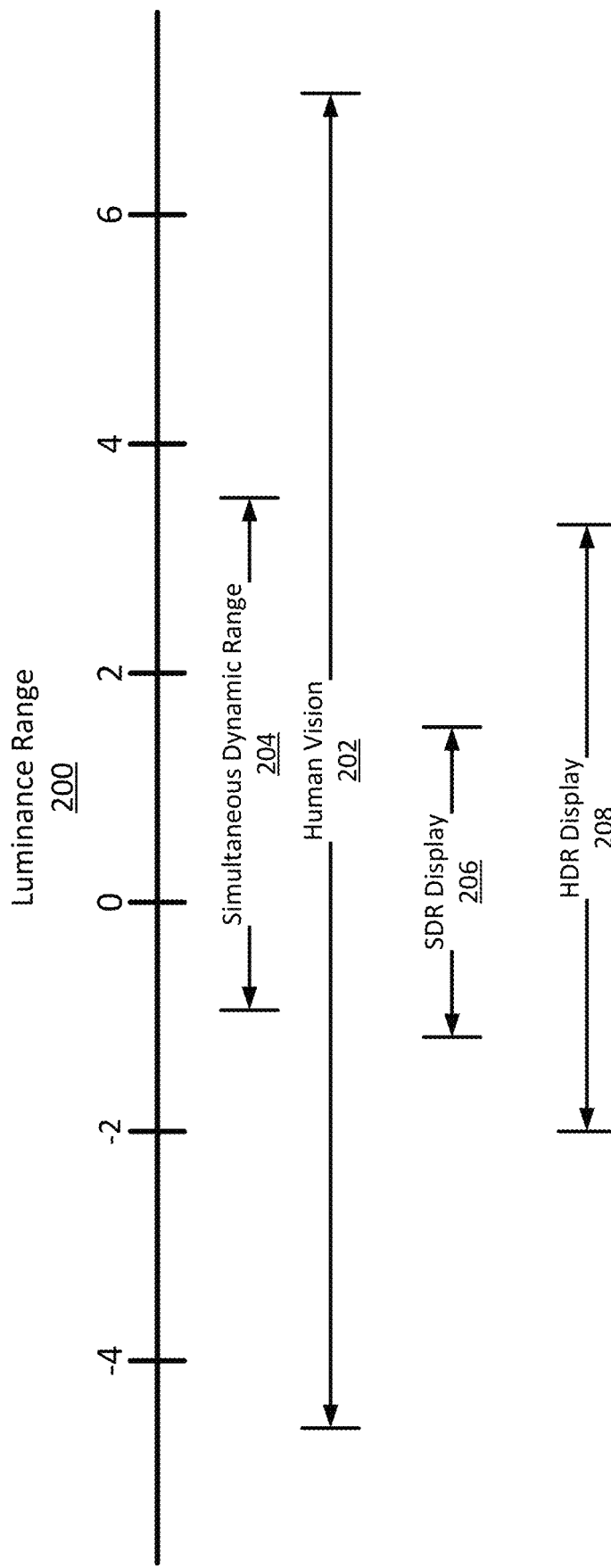
FIG. 2 illustrates the dynamic range of typical human vision, in comparison with the dynamic range of various display types.

FIG. 2 illustrates the dynamic range of typical human vision 202, in comparison with the dynamic range of various display types. FIG. 2 illustrates a luminance range 200, in a nits log scale (e.g., in $cd/m^2$ logarithmic scale). By way of example, starlight is at approximately 0.0001 nits on the illustrated luminance range 200, and moonlight is at about 0.01 nits. Typical indoor light may be between 1 and 100 on the luminance range 200. Sunlight may be between 10,000 nits and 1,000,000 nits on the luminance range 200.

Human vision 202 is capable of perceiving anywhere between less than 0.0001 nits to greater than 1,000,000 nits, with the precise range varying from person to person. The dynamic range of human vision 202 includes a simultaneous dynamic range 204. The simultaneous dynamic range 204 is defined as the ratio between the highest and lowest luminance values at which objects can be detected, while the eye is at full adaption. Full adaptation occurs when the eye is at a steady state after having adjusted to a current ambient light condition or luminance level. Though the simultaneous dynamic range 204 is illustrated in the example of FIG. 2 as between about 0.1 nits and about 3200 nits, the simultaneous dynamic range 204 can be centered at other points along the luminance range 200 and the width can vary at different luminance levels. Additionally, the simultaneous dynamic range 204 can vary from one person to another.

FIG. 2 further illustrates an approximate dynamic range for SDR displays 206 and HDR display 208. SDR displays 206 include monitors, televisions, tablet screens, smart phone screens, and other display devices that are capable of displaying SDR video HDR displays 208 include, for example, ultra-high-definition televisions and other televisions and monitors.

BT.709 provides that the dynamic range of SDR displays 206 can be about 0.1 to 100 nits, or about 10 f-stops, which is significantly less than the dynamic range of human vision 202. The dynamic range of SDR displays 206 is also less than the illustrated simultaneous dynamic range 204. SDR displays 206 are also unable to accurately reproduce night time conditions (e.g., starlight, at about 0.0001 nits) or bright outdoor conditions (e.g., around 1,000,000 nits).

HDR displays 208 can cover a wider dynamic range than can SDR displays 206. For example, HDR displays 208 may have a dynamic range of about 0.01 nits to about 5600 nits or 16 f-stops. While HDR displays 208 also do not encompass the dynamic range of human vision, HDR displays 208 may come closer to being able to cover the simultaneous dynamic range 204 of the average person. Specifications for dynamic range parameters for HDR displays 208 can be found, for example, in BT.2020 and ST 2084.

Figure 3:
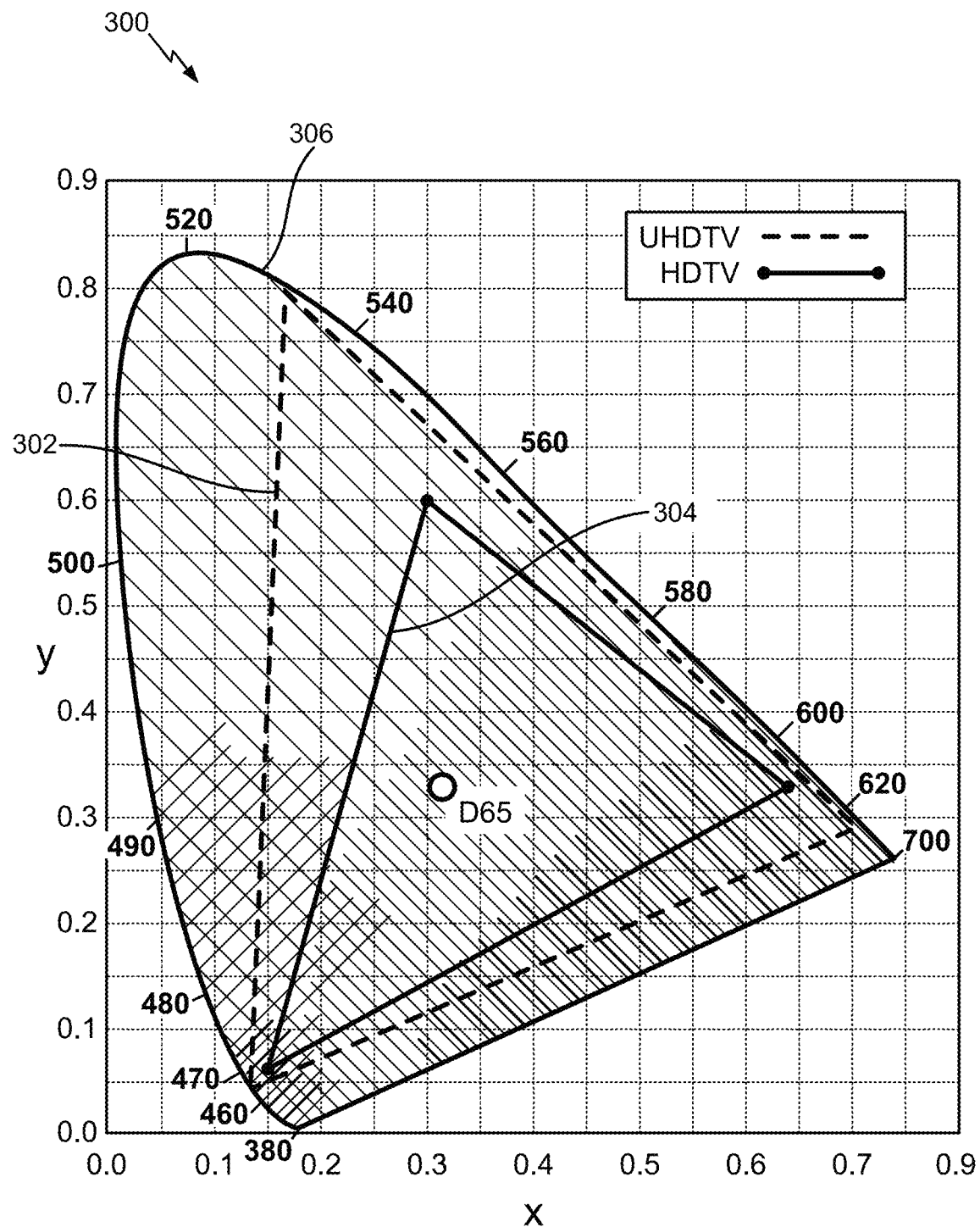
FIG. 3 illustrates an example of a chromaticity diagram, overlaid with a triangle representing an SDR color gamut and a triangle representing an HDR color gamut.

Color gamut describes the range of colors that are available on a particular device, such as a display or a printer. Color gamut can also be referred to as color dimension. FIG. 3 illustrates an example of a chromaticity diagram 300, overlaid with a triangle representing an SDR color gamut 304 and a triangle representing an HDR color gamut 302. Values on the curve 306 in the diagram 300 are the spectrum of colors; that is, the colors evoked by a single wavelength of light in the visible spectrum. The colors below the curve 306 are non-spectral: the straight line between the lower points of the curve 306 is referred to as the line of purples, and the colors within the interior of the diagram 300 are unsaturated colors that are various mixtures of a spectral color or a purple color with white. A point labeled D65 indicates the location of white for the illustrated spectral curve 306. The curve 306 can also be referred to as the spectrum locus or spectral locus.

The triangle representing an SDR color gamut 304 is based on the red, green, and blue color primaries as provided by BT.709. The SDR color gamut 304 is the color space used by HDTVs, SDR broadcasts, and other digital media content.

The triangle representing an HDR color gamut 302 is based on the red, green, and blue color primaries as provided by BT.2020. As illustrated by FIG. 3, the HDR color gamut 302 provides about 70% more colors than the SDR color gamut 304. Color gamuts defined by other standards, such as Digital Cinema Initiatives (DCI) P3 (referred to as DCI-P3) provide even more colors than the HDR color gamut 302. DCI-P3 is used for digital move projection.

Table 1 illustrates examples of color gamut parameters, including those provided by BT.709, BT.2020, and DCI-P3. For each color gamut definition, Table 1 provides an x and a y coordinate for a chromaticity diagram.

TABLE 1

Color Gamut Parameters

| | Color Space | | | | | | | |
|---|---|---|---|---|---|---|---|---|
| | White Point | | Primary Colors | | | | | |
| | $x_w$ | $y_w$ | $x_r$ | $y_r$ | $x_g$ | $y_g$ | $x_b$ | $y_b$ |
| DCI-P3 | 0.314 | 0.351 | 0.68 | 0.32 | 0.265 | 0.69 | 0.15 | 0.06 |
| BT.709 | 0.3127 | 0.329 | 0.64 | 0.33 | 0.3 | 0.6 | 0.15 | 0.06 |
| BT.2020 | 0.3127 | 0.329 | 0.708 | 0.292 | 0.170 | 0.797 | 0.131 | 0.046 |

Video data with a large color volume (e.g., video data with a high dynamic range and wide color gamut) can be acquired and stored with a high degree of precision per component. For example, floating point values can be used to represent the luma and chroma values of each pixel. As a further example, 4:4:4 chroma format, where the luma, chroma-blue, and chroma-red components each have the same sample rate, may be used. The 4:4:4 notation can also be used to refer to the Red-Green-Blue (RGB) color format. As a further example, a very wide color space, such as that defined by International Commission on Illumination (CIE) 1931 XYZ, may be used. Video data represented with a high degree of precision may be nearly mathematically lossless. A high-precision representation, however, may include redundancies and may not be optimal for compression. Thus, a lower-precision format that aims to display the color volume that can be seen by the human eye is often used.

Figure 4:
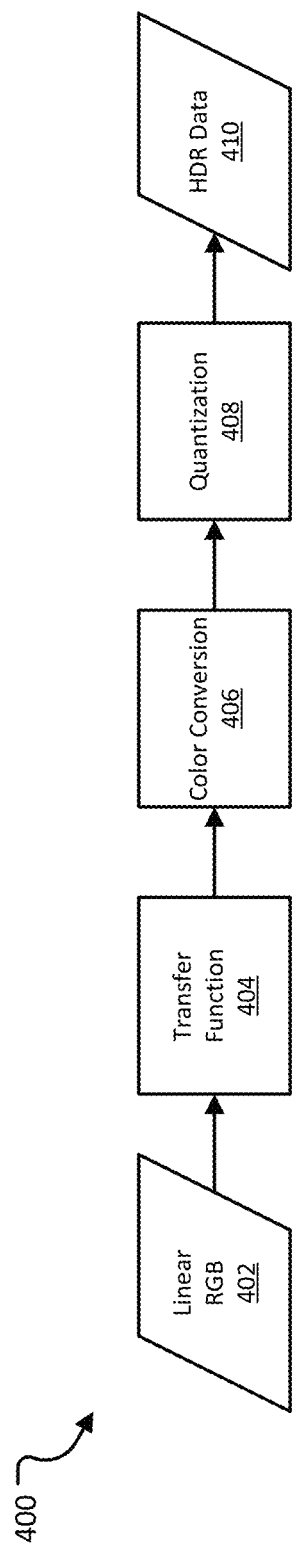
FIG. 4 illustrates an example of a process for converting high-precision linear RGB 402 video data to HDR data.

FIG. 4 illustrates an example of a process 400 for converting high-precision linear RGB 402 video data to HDR data 410. The HDR data 410 may have a lower precision and may be more easily compressed. The example process 400 includes a non-linear transfer function 404, which can compact the dynamic range, a color conversion 406 that can produce a more compact or robust color space, and a quantization 408 function that can convert floating point representations to integer representations.

In various examples, linear RGB 402 data, which can have a high dynamic range and a floating point representation, can be compacted using the non-linear transfer function 404. An example of a non-linear transfer function 404 is the perceptual quantizer defined in ST 2084. The output of the transfer function 404 can be converted to a target color space by the color conversion 406. The target color space can be one that is more suitable for compression, such as YCbCr. Quantization 408 can then be used to convert the data to an integer representation.

The order of the steps of the example process 400 is one example of the order in which the steps can be performed. In other examples, the steps can occur in a different order. For example, the color conversion 406 can precede the transfer function 404. In other examples, additional processing can also occur. For example, spatial subsampling may be applied to color components.

The transfer function 404 can be used to map the digital values in an image to and from optical energy. Optical energy, which is also referred to as optical power, is the degree to which a lens, mirror, or other optical system converges or diverges light. The transfer function 404 can be applied to the data in an image to compact the dynamic range. Compacting the dynamic range may enable video content to represent the data with a limited number of bits. The transfer function 404 can be a one-dimensional, non-linear function that can either reflect the inverse of the electro-optical transfer function (EOTF) of an end consumer display (e.g., as specified for SDR in ITU-R Recommendation BT.1886 (referred to herein as "BT.1886") or in BT.709), or approximate the human visual system's perception of brightness changes (e.g., as a provided for HDR by the perceptual quantizer (PQ) transfer function specified in ST 2084). An electro-optical transfer function describes how to turn digital values, referred to as code levels or code values, into visible light. The inverse process of the electro-optical transform is the optical-electro transform (OETF), which produce code levels from luminance.

Figure 5:
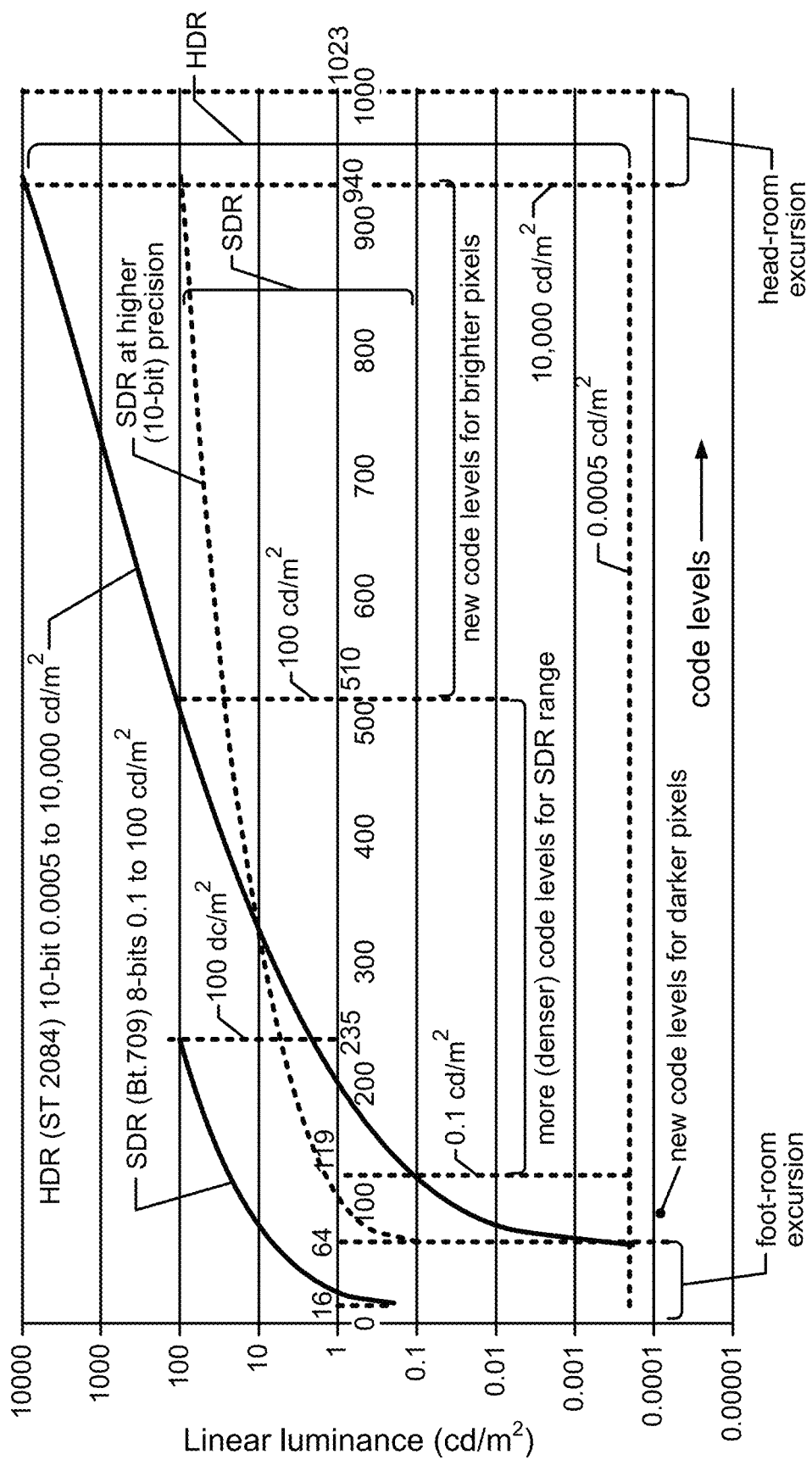
FIG. 5 illustrates examples of luminance curves produced by transfer functions defined by various standards.

FIG. 5 illustrates examples of luminance curves produced by transfer functions defined by various standards. Each curve charts a luminance value at different code levels. FIG. 5 also illustrates dynamic range enabled by each transfer function. In other examples, curves can separately be drawn for red (R), green (G), and blue (B) color components.

A reference electro-optical transfer function is specified in BT.1886. The transfer function is given by the following equation:

$$L = a(\max[V+b), 0])^\gamma$$

In the above equation:
L is the screen's luminance in $cd/m^2$;
LW is the screen luminance for white;
LB is the screen luminance for black;
V is the input video signal level (normalized, such that black occurs at V=0 and white at occurs V=1). For content mastered per BT.709, 10-bit digital code values "D" map into values of V per the following equation: V=(D−64)/876;
γ is an exponent of power function, where γ=2.404;
a is a variable for user gain (legacy "contrast" control), where:

$$a = (L_W^{1/\gamma} - L_B^{1/\gamma})^\gamma$$

and b is a variable for user black level lift (legacy "brightness" control), where:

$$b = \frac{L_B^{1/\gamma}}{L_W^{1/\gamma} - L_B^{1/\gamma}}$$

The above variables a and b can be derived by solving the following equations such that V=1 gives L=LW and such that V=0 gives L=LB:

$$L_B = a \cdot b^\gamma$$

$$L_W = a \cdot (1+b)^\gamma$$

ST 2084 provides a transfer function that can more efficiently support a higher dynamic range data more efficiently. The transfer function of ST 2084 is applied to normalized, linear R, G, and B values, which produces non-linear representations, R', G', and B'. ST 2084 further defines normalization by NORM=10000, which is associated with a peak brightness of 10,000 nits. The R', G', and B' values can be calculated as follows:

$$R' = PQ\_TF(\max(0, \min(R/NORM, 1)))$$

$$G' = PQ\_TF(\max(0, \min(G/NORM, 1)))$$

$$B' = PQ\_TF(\max(0, \min(B/NORM, 1))) \quad (1)$$

In Equation (1), the transfer function, PQ_TF, is defined as follows:

$$PQ\_TF(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

The electro-optical transfer function can be defined as a function with a floating point accuracy. By having floating point accuracy, it is possible to avoid introducing errors into a signal that incorporates the non-linearity of the function when an optical-electro transfer function is applied. This inverse transfer function specified by ST 2048 is as follows:

$$R = 10000 * \text{inversePQ\_TF}(R')$$

$$G = 10000 * \text{inversePQ\_TF}(G')$$

$$B = 10000 * \text{inversePQ\_TF}(B') \quad (2)$$

In Equation (2), the inverse transfer function, inversePQ_TF, is defined as follows:

$$\text{inversePQ\_TF}(N) = \left(\frac{\max[(N^{1/m_2} - c_1), 0]}{c_2 - c_3 N^{1/m_2}}\right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Other transfer functions and inverse transfer functions have been defined. A video coding system can use one of these other transfer functions and inverse transfer functions instead of or in addition those provided by ST 2084.

The color conversion 406 can reduce the size of the color space of the linear RGB 402 input. Image capture systems often capture images as RGB data. The RGB color space, however, can have a high degree of redundancy among color components. RGB is thus not optimal for producing a compact representation of the data. To achieve a more compact and more robust representation, RGB components can be converted to a more uncorrelated color space, such as YCbCr, which may be more suitable for compression. The target color space produced by the color conversion 406 may separate the brightness, represented by luminance, and color information in different un-correlated components.

The YCbCr color space is one target color space used by BT.709. BT.709 provides the follow conversion for the non-linear R', G', and B' values to a non-constant luminance representation, Y', Cb, and Cr:

$$Y' = 0.2126*R' + 0.7152*G' + 0.0722*B' \quad (3)$$

$$Cb = \frac{B' - Y'}{1.8556}$$

$$Cr = \frac{R' - Y'}{1.5748}$$

The conversion provided by Equation (3) can also be implemented using the following approximate conversion, which avoids the division for the Cb and Cr components:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (4)$$

The BT.2020 specifies the following conversion process from R', G', and B' to Y, Cb, and Cr:

$$Y' = 0.2627*R' + 0.6780*G' + 0.0593*B' \quad (5)$$

$$Cb = \frac{B' - Y'}{1.8814}$$

$$Cr = \frac{R' - Y'}{1.4746}$$

The conversion provided by Equation (5) can also be implemented using the following approximate conversion, which avoids the division for the Cb and Cr components:

$$Y'=0.262700*R'+0.678000*G'+0.059300*B'$$

$$Cb=-0.139630*R'-0.360370*G'+0.500000*B'$$

$$Cr=0.500000*R'-0.459786*G'-0.040214*B' \quad (6)$$

After color conversion 406, the input data, now in the target color space, may still be represented with a high-bit depth (e.g., with floating point accuracy). The quantization 408 can convert the data to a target bit depth. In some examples, 10-bit to 12-bit accuracy, in combination with the PQ transfer function, may be sufficient for the HDR data 410 to have 16 f-stops with a distortion that is just below what is noticeable by human vision. HDR data 410 with 10-bit accuracy can further be coded by most video coding systems. Quantization 408 is lossy, meaning that some information is lost, and may be a source of inaccuracy in the HDR data 410 output by the process 400.

The following equations provide an example of quantization 408 that can be applied to code words in the target color space. For example, input values for Y, Cb, and Cr that have floating point accuracy can be converted into fixed bit depth values BitDepth$_Y$ for the Y value and BitDepthC for the chroma values (Cb and Cr).

An example of such quantization can be applied to code words in target color space, such as YCbCr as shown in the following example. For example, input values YCbCr represented in floating point accuracy are converted into a signal of fixed bit-depth BitDepthY for the Y value and BitDepthc for the chroma values (Cb, Cr).

$$D_Y=Clip1_Y(Round((1<<(BitDepth_Y-8))*(219*Y'+16)))$$

$$D_{Cb}=Clip1_C(Round((1<<(BitDepth_C-8))*(224*Cb+128)))$$

$$D_{Cr}=Clip1_C(Round((1<<(BitDepth_C-8))*(224*Cr+128))) \quad (7)$$

In the above:
Round(x)=Sign(x)*Floor(Abs(x)+0.5)
Sign(x)=−1 if x<0, 0 if x=0, 1 if x>0
Floor(x) the largest integer less than or equal to x
Abs(x)=x if x>=0, −x if x<0
Clip1Y(x)=Clip3(0, (1<<BitDepthY)−1, x)
Clip1C(x)=Clip3(0, (1<<BitDepthC)−1, x)
Clip3(x,y,z)=x if z<x, y if z>y, z otherwise The HDR data 410 produced by the example process 400 can be compressed or encoded by an encoder, for example using the AVC HEVC, or VP8/VP9/VP10 standards, to produce an encoded bitstream. A bitstream can be stored and/or transmitted. The bitstream can be decompressed or decoded by a decoder to produce an uncompressed video signal.

The uncompressed video signal can be transmitted to an end consumer device using, for example, a high-speed digital interface. Examples of consumer electronic devices and transmission mediums include digital televisions, digital cable, satellite or terrestrial set-top boxes, mobile devices, and related peripheral devices, such as Digital Versatile Disc (DVD) players and/or recorders, and other related decoding devices and consumer devices.

Protocols, requirements, and recommendations for high-speed digital interfaces are defined in specifications produced by the Consumer Electronics Association (CTA) Digital Television (DTV) Subcommittee, such as CTA-861. Examples of protocols, requirements, and recommendations defined by CTA-861 include video formats and waveform; colorimetry and quantization; transport of compressed and uncompressed video data, as well as Linear Pulse Code Modulation (L-PCM) audio; carriage of auxiliary data; and implementations of the Video Electronics Standards Association (VESA) Enhanced Extended Display Identification Data Standard (E-EDID), which is used by consumer devices to declare display capabilities and characteristics.

The CTA 861-G version of the CTA-861 specification includes an Extended InfoFrame data structure, which can carry larger amounts of dynamic metadata. Dynamic, in this context means the data may vary temporally, that is, over time. The data carried in the Extended InfoFrame data structure can be used by an end device, such as a display, television or other device that can process a video signal, such as a decoder or receiver. The data can be used, for example, for smart processing, guided mapping, display adaptation, and color volume transformation applicable to the end device. An Extended InfoFrame can have a type, which is specified by a 2-byte number. When the Extended InfoFrame Type value is set to 0x0001, 0x0002, 0x0003, or 0x0004, the Extended InfoFrame carries HDR Dynamic Metadata. The HDR Dynamic Metadata Extended InfoFrame contains the HDR Dynamic Metadata that can be encoded into Supplementary Enhancement Information (SEI) messages in an encoded bitstream. SEI messages can be used in AVC, HEVC, and VP8/VP9/VP10 bitstreams, as well as bitstreams produced according to other standards.

A decoder can support transmission of certain types of HDR Dynamic Metadata Extended InfoFrames. The decoder can further determine whether a target end device is capable of receiving the HDR Dynamic Metadata Extended InfoFrames, and if so, can send the InfoFrames with associated video encoded according to the type of the InfoFrames. In some examples, a decoder will not send an HDR Dynamic Metadata Extended InfoFrame that is of type 0x0001, 0x0002, 0x0003, or 0x004 to an end device that does not indicate support for that Extended InfoFrame type. The end device can, for example, use an HDR Dynamic Metadata Data Block to indicate the types of HDR Dynamic Metadata Extended InfoFrames the end device supports.

Communication between an end device and a decoder can be conducted using Extended Display Identification Data (EDID). EDID is a data structure provided by an end device to describe the capabilities of the end device. For example, the EDID can describe video formats that the end device is capable of receiving and rendering. An end device can provide the EDID to a decoder at the request of the decoder. The decoder can select an output format based on the information provided by the EDID, taking into account the format of an input bitstream and formats supported by the end device.

In various examples, several data blocks can be used to specify parameters that describe the display capabilities of an end device. Examples of such data blocks include a Colorimetry Data Block, an HDR Static Metadata Block, a HDR Dynamic Metadata Data Block, in addition to other data blocks. The Colorimetry Data Block can indicate colorimetry standards and color gamut standards, such as BT.2020 or DCI-P3, supported by an end device. The HDR Data Block indicates the HDR capabilities of the end device through parameters such as parameters describing characteristics of the display's EOTF (e.g., BT.1886, ST 2084, or others), parameters describing a desired dynamic range (e.g. a desired minimum and/or maximum luminance), and/or parameters describing a desired maximum frame-average luminance for optimal rendering of content on the display. The HDR Dynamic Metadata Data Block indicates type and version of the supported HDR Dynamic Metadata Type.

As noted above, the SMTPE ST 2094 specifies four different color volume transforms, each published in a separate document. These documents are designated ST 2094-10, ST 2094-20, ST 2094-30, and ST 2094-40.

ST 2094-10 describes dynamic HDR metadata, where dynamic can mean that the color volume transform can depend upon the video content. For example, ST 2094-10 defines a parametric tone mapping function. ST 2094-10 further specifies that tone mapping can be performed in various color spaces, including YCbCr, RGB, and color spaces based on the human visual system. ST 2094-10 also provides a mathematical description of an example color volume transform from RGB input.

Figure 6:
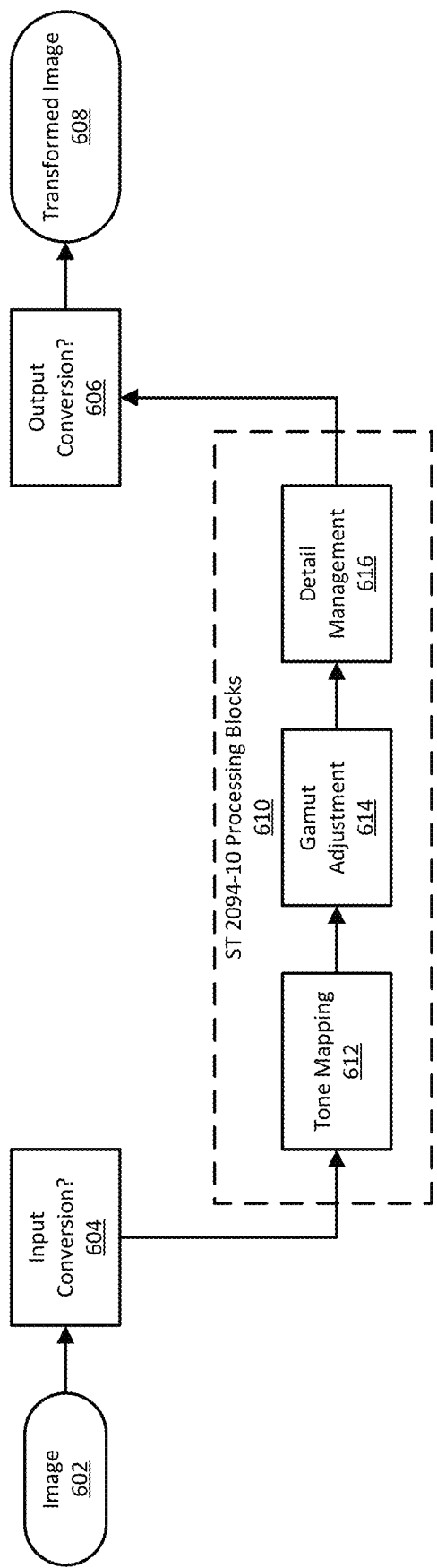
FIG. 6 illustrates an example of processing blocks that can be used in implementations of ST 2094-10.

FIG. 6 illustrates an example of processing blocks 610 that can be used in implementations of ST 2094-10. The processing blocks 610 are illustrated within a framework for a generalized color volume transform model provided by ST 2094-1. In this framework, an image 602, which can be a video frame or a part of a video frame, may undergo an input conversion 604, if needed. The input conversion 604 can convert the color space of the image 602 to an input color space. After the processing blocks 610 have operated on the image, an output conversion 606 may be applied, if needed, to convert the color space of the image to an output color space. The result of the overall process is a transformed image 608.

The process blocks 610 of ST 2094-10 implementations include a tone mapping 612 block, a gamut adjustment 614 block, an detail management 616 block.

Parameters and operation process blocks 610 can be described as follows; in the description that follows PQ stands for perceptual quantizer:

MaxRGB-Based Tone Mapping:

For maxRGB-based Tone Mapping the following parameters are defined:

MinimumPqencodedMaxrgb—the lowest PQ-encoded maxRGB value of the reduced pixel set.

AveragePqencodedMaxrgb—the average of the PQ-encoded maxRGB values of the reduced pixel set.

MaximumPqencodedMaxrgb—the highest PQ-encoded maxRGB value of the reduced pixel set.

MinimumPqencodedMaxrgbOffset—an offset in the same unit as MinimumPqencodedMaxrgb to be added to the MinimumPqencodedMaxrgb value.

AveragePqencodedMaxrgbOffset—an offset in the same unit as AveragePqencodedMaxrgb to be added to the AveragePqencodedMaxrgb value.

MaximumPqencodedMaxrgbOffset—an offset in the same unit as MaximumPqencodedMaxrgb to be added to the MaximumPqencodedMaxrgb value.

Offset, Gain and Gamma-Based Tone Mapping

Equation 8 below defines a tone mapping function for Offset, Gain and Gamma-based Tone Mapping:

$$y = (\min(\max(0,(x \times g)+o),1))^P \quad (8)$$

In Equation 8, y=output value; x=input value; g=value of Tone Mapping Gain; o=value of Tone Mapping Offset; and P=value of Tone Mapping Gamma.

The following HDR parameters can be signaled (e.g., provided and/or encoded into a bitstream) for use in Equation 8:

ToneMappingOffset—the Tone Mapping Offset used in equation (8).

ToneMappingGain—the Tone Mapping Gain used in equation (8).

ToneMappingGamma—the Tone Mapping Gamma used in equation (8).

The following parameters are also defined in ST 2094-10:

ChromaCompensationWeight is an amount of chroma adjustment.

SaturationGain is an amount of saturation adjustment.

ToneDetailFactor is a parameter that controls the contribution of the detail management function to the tone mapping result.

The following constraints are also defined by ST 2094-10. ST 2094-10 specifies the scope of HDR metadata as such that the metadata shall contain exactly one of each of the following:

TimeInterval information defined through parameters specified in ST 2094-1; includes:
 TimeIntervalStart
 TimeIntervalDuration ProcessingWindow information defined through parameters specified in ST 2094-1; includes:
 UpperLeftCorner
 LowerRightCorner
 WindowNumber TargetedSystemDisplay information defined through parameters specified in ST 2094-1; includes:
 TargetedSystemDisplayPrimaries
 TargetedSystemDisplayWhitePointChromaticity
 TargetedSystemDisplayMaximumLuminance
 TargetedSystemDisplayMinimumLuminance ColorVolumeTransform Parameters:
 ImageCharacteristicsLayer, which shall contain exactly one of each of the following named items:

MinimumPqencodedMaxrgb
AveragePqencodedMaxrgb
MaximumPqencodedMaxrgb
ManualAdjustmentLayer, which may contain any combination having zero or one of each of the following named items:
MinimumPqencodedMaxrgbOffset
AveragePqencodedMaxrgbOffset
MaximumPqencodedMaxrgbOffset
ToneMappingOffset
ToneMappingGain
ToneMappingGamma
ChromaCompensationWeight
SaturationGain
ToneDetailFactor ST 2094-10 defines a set of HDR parameters that can be used for color volume transforms. The standard also provides informational examples illustrating how the HDR parameters can be used. The ST 2094 suit of standards, however, does not define the manner in which the parameters are to signaled (e.g., provided in an encoded bitstream). Standards Development Organizations (SDOs), such as the European Telecommunications Standards Institute (ETSI), CTA, and MPEG, are expected to develop standards for transmission of HDR parameters in an encoded bitstream. For example, CTA-861-G is a standard that specifies a format for transmitting HDR dynamic metadata defined in ST 2094 over digital audio/video interfaces.

In HEVC and AVC bitstreams, among others, the HDR parameters can be provided using SEI messages. A format for encoding the parameters defined by ST 2094-20 in SEI messages is defined, for example, in ETSI Technical Specification 103 433. The parameters defined by ST 2094-30 can be encoded, for example, in the Color Remapping Information SEI message of HEVC or AVC.

An example of an SEI message for signaling the parameters defined by ST 2094-10 in HEVC was proposed to be added to the Joint Collaborative Team on Video Coding (JCTVC) JCTVC-X004, but this proposal was not adopted.

For specific systems, standards bodies such as Advanced Television Systems Committee (ATSC) and Digital Video Broadcasting (DVB) can define a format for signaling ST 2094-10 parameters. For example, the parameters can be encoded in user data registered SEI messages that can be added to a coded bitstream. Such SEI messages can be optimized for the HDR video system for which the standards bodies provide specifications. Additionally, the SEI messages can be defined such that the SEI messages unambiguously define an implementation for the ST 2094-10 parameters for a specific HDR video system.

Provided are systems and methods for a standardized mechanism for encoding ST 2094-10 metadata in coded bitstreams. The techniques described below can provide an unambiguous definition for receiving and parsing ST 2094-10 in an HDR video system. The techniques can also reduce the implementation complexity of receivers. The techniques include color space signaling and information that can be used for color space conversion, constraining the number of processing elements of ST 2094 what would be used by an HDR video system, constraining usage of ST 2094-10 reserved values that would be used, constraining mandatory signaling of supplementary information, signaling target display capabilities such as color gamut and the minimum luminance, coding ext_block_length (e.g., the field that indicates the length of the metadata block) with fixed length coding, and specification of associations between processing elements of ST 2094 that would be used by HDR video system, among other things.

These techniques provide a standardized signaling mechanism where none is defined by ST 2094-10. These techniques also can define a complete video system by filling gaps not defined by ST 2094-10, such is the manner in which HDR parameters should be used, a description of the input, and which output color volume transform to use, among other things. Incorporation of elements of ST 2094-10 into SEI messages is described, as well as constraints on use of these elements.

In a first example, color space and conversion can be signaled for a HDR video system that implements ST 2094-10. As discussed above, ST 2094-10 defines metadata that can indicate the color space of an input video signal and metadata that can be used for converting the input color space to another color space. Examples of input and working color spaces may include YCbCr and ICtCp (where I is the luma component and Ct and Cp are the blue-yellow and red-green chroma components, respectively), which is defined by ITU-T Recommendation BT.2100 In some examples, exact matrices of color transforms for conversion from an input color space to a working color space, and for converting from the working color space to an output color space. In these examples, the working color space is one in which a tone mapping function can be applied.

In some examples, a decoder or receiver of an HDR video system can select a color transform matrix from among sets of matrices provided in a coded bitstream. The decoder can, for example, use the values of the HEVC video usability information (VUI) parameters, color_primaries and/or matrix_coeffs, to select a color transform matrix.

In some examples, constraints can be defined for parameters of the color transform matrices. These constraints can simplify the implementation of receivers. For example, the entries of a color transform matrix can be constrained to the values defined by the YCbCr or ICtCp color spaces.

In some examples, a flag can be used to indicate whether a particular color transform and any related offsets are present in a bitstream. For example, a flag called "RGBtoLMS_coeff_present_flag" can indicate whether RGB to LMS color space conversion parameters are available in the bitstream (LMS is a color space that represents the response of the three types of cones of the human eye, and is named for the responsivity or sensitivity peaks at long, medium, and short wavelengths). As another example, a flag called "YCCtoRGB_coef_present_flag" can indicate whether the bitstream include parameters that can be used to execute a YCbCr to RGB color conversion. In some cases, a value of 1 for either of these flags can indicate that the color conversion parameters and any related offsets are present and a value of 0 can indicate that the color version parameters are not available in the bitstream.

In some examples, when the color transform parameters are not present, the values of the coefficients are inferred to be those of the identity matrix. In some examples, when the color transform parameters are not present, the values of the parameters are inferred to be zero. In some examples, other default values for the color transform parameters and offsets are possible.

In a second example, the number of processing elements of ST 2094-10 that are used by an HDR video system can be constrained. Constraining the number of processing elements can both provide an unambiguous definition for receiving and parsing ST 2094-10 parameters, and simplify the implementation of an HDR receiver. For example, ST 2094-10 does not specify a number of extended blocks that can be included in a bitstream, where extended blocks can include processing elements. Having an undefined number of extended blocks can mean that the amount of memory that a decoder needs to store the blocks, and the amount of processing resources needed to process the blocks, may be unknown. Thus, in various examples, the number of extended blocks can be constrained, so that decoders can predetermine the memory and processing resources needed for processing the blocks. ST 2094-10 processing elements can include processed picture fragments, processing windows, content description elements, target display description elements, and tone mapping models, among other things. The examples that follow can be used individually or in any suitable combination.

Processed picture fragments and processing windows (referred to as "ProcessingWindow" by ST 2094) describe portions of a display. For example, a display can include multiple, possibly overlapping windows, where each window can display a different video signal. An example of multiple windows in the same display is picture-in-picture, where an inset window in the display can include a different video signal than the video signal being output to the main part of the display. In some examples, the number of processed picture fragments and processing windows in a video signal is limited to fixed number that is less than 254. For example, the number can be set equal to a value from 1 to 16. As provided by ST 2094, the ext_block_level field for processed picture fragments and processing windows is set to 5. In accordance with constraining the number of processed picture fragments and processing windows, as another example, the number of extension blocks with an ext_block_level equal to 5 can be constrained to one.

Content descriptions elements (referred to as "ImageCharacteristcsLayer" by ST 2094) can provide information about a particular video signal. In some examples, the number of content description elements is set equal to 1. Extension blocks for content description elements have an ext_block_level value of 1. In some examples, the number of extension blocks with ext_block_level equal to 1 can be constrained to one.

Target display description elements (referred to by ST 2094 as "TargetedSystemDisplay") can provide information about a display device that a video signal can be displayed on. In some examples, the number of target display description elements is a value in the range from 1 to 16. Extension blocks for target display description elements have an ext_block_level value of 2 In some examples, the number of extension blocks with ext_block_level equal to 2 can be constrained to less than or equal to 16.

Tone mapping models can be used to map one set of colors to a second set of colors. For example, the second set of colors can approximate the appearance of HDR images on a system that has a more limited dynamic range. In some examples, for an HDR system that implements ST 2094-10, the number of tone mapping models (referred to as "ColorVolumeTransform in ST 2094) is a value from 1 to 16.

In some examples, the number of SEI messages signaling ST 2094-10 related information may not exceed two for each coded frame or access unit. In some examples, each access unit will have an associated SEI messages with ST 2094-10 metadata. In some examples, when such an SEI message is present, there will only be one per access unit.

In a third example, use of values that are reserved in ST 2094-10 is constrained. Constraining use of reserved values can guarantee that no unspecified or unsanctioned information is included in a bitstream.

In some examples, bitstreams complying current version of ST 2094-10 shall not include reserved values. For example, for extension blocks, some values for ext_block_level are reserved for use by ATSC. In these examples, these reserved values cannot be used in an HDR video system that implements ST 2094-10. Alternatively, in some examples, extension blocks that use a reserved value for ext_block_level will be ignored by a decoder.

In some examples, a decoder shall discard ST 2094-10 SEI messages that contain reserved values. In some cases, when a value of ext_block_level for an SEI messages is a value other than 1, 2, or 5, the SEI message shall be discarded. In some cases, when a value of ext_block_level is equal to a reserved value, the SEI message shall be discarded. Such examples can prevent a hole, in which arbitrary data of any size might be inserted in the SEI message.

In some examples, values of ext_block_level other than 1, 2, or 5 are reserved for future use by ATSC.

In some examples, values of ext_block_level other than 1, 2, or 5 are not allowed to be used in system based on the ATSC standard.

In a fourth example, constraints can be placed on mandatory signaling of supplementary information. The ATSC specification provides a tool box that can be used for signaling information about a video signal. This tool box enables a bitstream to encode multiple transfer functions, including the transfer functions defined by BR.709, BT.2020, and Hybrid Log Gamma (HLG), among others. Restricting the number of combinations, however, can simplify the implementation of a decoder. In some examples, SEI messages with a value of 4 for the payloadType can be used to transmit the characteristics of different transfer functions.

In some examples, a ST 2094-10 SEI message shall not be present when transfer_characteristics syntax element in the HEVC VUI is not equal to 16 (for the PQ transfer function of ST 2084).

In some examples, the ST 2094-10 SEI message shall not be present when transfer_characteristics syntax element in the HEVC VUI is not equal to 16 (for the PQ transfer function from ST 2084) or 18 (for the transfer function from HLG).

In some examples, an SEI message with mastering display color volume metadata, as defined by ST 2086, must be included in a bitstream that has an SEI message with ST 2094-parameters. In these examples, the syntax elements in the ST 2094-10 SEI message that convey the same information as in the SEI message for ST 2086 can be removed from SEI message for the ST 2094-10 parameters. In these examples, the corresponding information required to derive ST 2094-10 frame processing can be extracted from the ST 2086 SEI message.

In some examples, when a ST 2086 SEI message is present in the bitstream, syntax elements that are common between ST 2086 and ST 2094-10 are not signaled in the SEI message for ST 2094-10. Instead, the ST 2094-10 syntax elements can be inferred to be the same as the corresponding syntax elements in the ST 2086 SEI message.

In some examples, a flag (called, for example, "st2086_info_present_flag") can be used to indicate whether the syntax elements that are common between ST 2086 and ST 2094-10 are signaled in the SEI message for ST 2094-10.

In some examples, ST 2086 syntax elements are included in the SEI message for ST 2094-10. In these examples, for bitstreams or access units with an ST 2094-10 SEI message present, ST 2086 SEI messages are not allowed.

In some examples, when the mastering display information in an ST 2086 SEI message conflicts with display information in a ST 2094-10 SEI message, then ST 2094-10 information takes precedence for the processing of a frame.

In a fifth example, target display capabilities, such as color gamut and a minimum luminance can be signaled or indicated in a bitstream. The target display capabilities can indicate minimum requirements for a display device to be able to display a video signal encoded in a bitstream.

In some examples, an extension block that has a value of 2 for the ext_block_level can include a target display minimum luminance, target primaries, and a target white point.

In some examples, an additional block type can alternatively or additionally be added. Extension blocks having this type can contain the primaries, white point, and minimum luminance of the target display. For example, an extension block with an ext_block_level equal to 3, which would otherwise be reserved, could be used.

In a sixth example, the ext_block_length field for extension blocks can be encoded using a fixed length. The ext_block_length field can indicate the size of an extension block. For example, when the ext_block_level for an extension block is set to 1, the corresponding ext_block_length can be set to 5. As another example, when ext_block_level is set to 2, the ext_block_length can be set to 11. As another example, when ext_block_level is set to 5, the ext_block_length can be equal to 7. Limiting the number of bits that can be used for the ext_block_length can simplify the implementation of a decoder.

In some examples, the number of bits used to code the syntax element ext_block_length is chosen to be a fixed multiple of 8, or other suitable multiple.

In some examples, the range of values for the ext_block_length value is constrained to be between 0 and 255, inclusive.

In some examples, a constraint can instead or also be placed on the number of times the ext_dm_alignment_zero_bit syntax element is indicated in one ext_dm_data_block_payload( ) data structure. For example, the number of times the syntax element appears can be constrained to fewer than 7. The ext_dm_data_block_payload( ) data structure can be used to indicate different sets of parameters. For example, when ext_block_level is equal to 1, the ext_dm_data_block_payload( ) data structure can provide content range values, such as minimum, maximum, and average PQ values. As another example, when ext_block_level is 2, the ext_dm_data_block_payload( ) can include trimming values, such as a slope, offset, power, chroma weight, and saturation gain, among other things. As another example, when ext_block_level is 5, the ext_dm_data_block_payload( ) can describe an active area, also referred to herein as a display region. The ext_dm_data_block_payload( ) can also include a number of ext_dm_alignment_zero_bit elements, which can pad the size of the data structure out to a particular size.

In a seventh example, associations between ST 2094 processing elements can be specified.

As noted above, the ext_dm_data_block_payload( ) data structure can provide information related to gamut mapping parameters and scene parameters. For example, one or more ext_dm_data_block_payload( ) data structures can include a set of color volume transform parameters, which can be used by a decoder or receiver to transform a video signal into one that can be displayed by a particular device. In some examples, a specification can be provided for associating the color volume transform parameters in ext_dm_data_block_payload( ) data structures with active regions in a display. In some examples, video being displayed on a device can have more than one display region, where each region can be outputting a different video signal. In these examples, more than one video signal may be encoded into a bitstream. Each video signal may be associated with a set of color volume transform parameters. In some cases, two video signals can be associated with the same set of color volume transform parameters. Various techniques can be used to determine with which active region a set of color volume transform parameters is associated.

In some examples, an index can be used to indicate an association between a set of color volume parameters and a display region. For instance, for each ext_dm_data_block_payload( ) that does not indicate a display region to which the information in the data structure applies (e.g., the ext_block_level is equal to 1 or 2), syntax element can be used to indicate an association. For example, an SEI message can include syntax element in the form of a list of indexes, where the order of the indexes corresponds with the order in which ext_dm_data_block_payload( ) data structures appear in a bitstream. In this example, the index values can indicate one or more display regions with which each ext_dm_data_block_payload( ) is associated. As another example, active display regions can be indicated in an SEI message. In this example, a syntax element in the SEI message can indicate an active display region with which an ext_dm_data_block_payload is associated. In this example, active display regions can be identified by the order in which the active display regions are indicated in the SEI message, or each active display region can have an identifier.

In some examples, association of color volume transform parameters provided by ext_dm_data_block_payload( ) data structures with display regions can be based on the order in which the ext_dm_data_block_payload( ) data and/or display regions appear in a bitstream. For example, constraints can be placed on the order in which different types of ext_dm_data_block_payload( ) data structures appear in a bitstream. The type of a ext_dm_data_block_payload( ) can be indicated by the ext_block_level syntax element. In this example, the order in which the ext_dm_data_block_payload( ) data structures appear describes a display region with which the data structures are associated.

As an example of constraining the order of ext_dm_data_block_payload( ) data structures, for any value of i in the range of 0 to num_ext_blocks−1 (num_ext_blocks indicates the total number of extension blocks), where ext_dm_data_block_payload(i) indicates parameters for gamut mapping, if there exists any value j in the range of 0 to num_ext_blocks−1, inclusive, such that j is the smallest number that is greater than i for which ext_dm_data_block_payload(j) contains information about one or more active regions, and there exists a k that is greater than j such that k is the smallest number greater than j for which ext_dm_data_block_payload(k) indicates parameters for gamut mapping, then ext_dm_data_block_payload(i) is associated with regions indicated by ext_dm_data_block_payload(m) for m in the range of j to k−1, inclusive. Alternatively or additionally, if there exists any value j in the range of 0 to num_ext_blocks−1, inclusive, such that j is the smallest number that is greater than i for which ext_dm_data_block_payload(j) contains information about one or more active regions, and there exist no value of k that is greater than j such that ext_dm_data_block_payload(k) indicates parameters for gamut mapping, then ext_dm_data_block_payload(i) is associated with regions indicated by ext_dm_data_block_payload(m) for m in the range of j to num_ext_blocks−1, inclusive. Alternatively or additionally, ext_dm_data_block_payload(i) applies to the entire picture.

As another example of constraining the order of ext_dm_data_block_payload( ) data structures, parameters for gamut mapping can include one or more syntax elements that do not indicate a region for applying the gamut mapping.

In some examples, association of color volume transform parameters with display regions can be based on a block association. For instance, a ext_dm_data_block_payload( ) can be included in a bitstream that has a particular ext_block_level value (e.g., 6 or other suitable value), where an extension block of this type can indicate an association between gamut mapping parameters, target display characteristics, scene information, and active regions.

As an example, the ext_dm_data_block_payload( ) data structure can signal or indicate a number of associations between gamut mapping parameters, target display characteristics, scene information (collectively, color volume transform parameters) and active regions.

As another example, for each association, the ext_dm_data_block_payload( ) data structure can one or more values that indicate the number of blocks used to define the association. In this example, in some cases, the one or more values for each association is not explicitly signaled and can be fixed to be a default value. Alternatively or additionally, a syntax element can be used to indicate the mode of association. In such examples, for each mode, the one or more values can either be inferred from or the mode, or can be signaled. In such examples, for each mode, one more blocks of a particular value may be required to be specified in the association. Alternatively or additionally, in some examples, for each association, a syntax element can signal the indices corresponding to the block that specifies the association. In such examples, the indices can correspond to the index of the ext_dm_data_block_payload( ) data structure as signaled in the SEI message. In such examples, the indices for a particular value of ext_block_level can correspond to the index of the ext_dm_data_block_payload syntax structure of that particular value of ext_block_level as signaled in the SEI message.

In some examples, explicit region information is sent along with each set of gamut mapping parameters, scene information, and target display characteristics.

In some examples, scene information may include one or more syntax elements that indicated minimum, maximum, average luminance information of the scene. Gamut mapping parameters may include parameters of mapping functions used to do the gamut mapping. Target display characteristics may include characteristics of display including minimum and maximum luminance, color primaries, and a white point of the display. Region information may include the coordinates that indicate a region (e.g. four coordinates for a rectangular region) to which a subset of the parameters are applicable, one or more identifiers associated with the region, and one or more parameters (describing shapes in color coordinate domain or spatial domain) to further specify the sub-region of the region where the mapping is to be applied.

In some examples, gamut mapping parameters may be used to indicate all information in an ext_dm_data_block_payload( ) data structure that are not related to signaling of regions (e.g., gamut mapping parameters, scene information, and target display characteristics).

In an eighth example, signaling additional syntax elements and modifying syntax structure may be performed to allow the possibility of future extensibility using reserved values of ext_block_level. This may include signaling of syntax element occupying one bit as many times as there are bits in the ext_dm_data_block_payload for values of ext_block_level that are reserved in the current version of the specification.

In various examples, a decoder or receiver of an HDR video system can perform conformance checks on a bitstream. For example, the decoder or receiver can verify whether constraints and limitations, as described above, have been adhered to. The decoder can perform a conformance check, for example, in line with decoding the bitstream or before starting to decode the bitstream. When a bitstream or portion of a bitstream fails the conformance check, the decoder can take various actions. For example, the decoder can ignore a data structure that fails a conformance check, and can proceed with decoding the bitstream after the data structure. As another example, the decoder can stop decoding the bitstream from the point at which the bitstream fails the conformance check. As a further example, the decoder can reject the entire bitstream.

Several example implementations of the above-described methods will now be described. The following example implementations implement one or more of the examples described above. The example implementations are illustrated using syntax structures and semantics defined by ATSC. Changes to the syntax structure and semantics are indicated as follows: [[text within double brackets]] indicates deletions and underlined text indicates additions.

First Example

Changes to Syntax Structures:

TABLE E.2

| ext_dm_data_block( ) 1 | |
| --- | --- |
|  | Descriptor |
| ext_dm_metadata_block(i) {<br>    ext_block_length[ i ]<br>    ext_block_level [ i ]<br>    ext_dm_data_block_payload<br>    ( ext_block_length[ i ],<br>    ext_block_level [ i ] )<br>} | <br>[[ue(v)]]u(8)<br>u(8) |

TABLE E.3

| ext_dm_data_block_payload( ) | |
| --- | --- |
|  | Descriptor |
| ext_dm_data_block_payload( ext_block_length,<br>ext_block_level) {<br>    ext_block_len_bits = 8 * ext_block_length<br>    ext_block_use_bits = 0<br>    if( ext_block_level == 1 ) {<br>        min_PQ<br>        max_PQ<br>        avg_PQ<br>        ext_block_use_bits += 36<br>    }<br>    if( ext_block_level == 2 ) {<br>        target_max_PQ<br>        trim_slope<br>        trim_offset<br>        trim_power | <br><br><br><br><br>u(12)<br>u(12)<br>u(12)<br><br><br><br>u(12)<br>u(12)<br>u(12)<br>u(12) |

TABLE E.3-continued ext_dm_data_block_payload( )

| | Descriptor |
|---|---|
| trim_chroma_weight | u(12) |
| trim_saturation_gain | u(12) |
| ms_weight | i(13) |
| ext_block_use_bits += 85 | |
| } | |
| if( ext_block_level == 5 ) { | |
|    active_area_left_offset | u(13) |
|    active_area_right_offset | u(13) |
|    active_area_top_offset | u(13) |
|    active_area_bottom_offset | u(13) |
|    ext_block_use_bits += 52 | |
| } | |
| <u>if( ext_block_level == 6 ){</u> | |
|    <u>num_associations</u> | <u>u(4)</u> |
|    <u>for( i = 0 i < num_associations ; i++ ) {</u> | |
|       <u>num_blks_in_assoc[ i ]</u> | <u>u(8)</u> |
|       <u>for( j = 0 ; j < num_blks_in_assoc[ i ] ; j++)</u> | |
|          <u>blk_idx_in_assoc[ i ][ j ]</u> | <u>u(8)</u> |
|       <u>ext_block_use_bits += 8* num_blks_in_assoc[ i ] + 8</u> | |
|    <u>ext_block_use_bits += 4</u> | |
| <u>}</u> | |
| if(ext_block_level == 1 ‖ ext_block_level == 2 ‖ ext_block_level == 5 ‖ <u>ext_block_level == 6</u> ) | |
|    while( ext_block_use_bits++ < ext_block_len_bits ) | |
|       ext_dm_alignment_zero_bit | f(1) |
| else | |
|    while( ext_block_use_bits++ < ext_block_len_bits ) | |
|       ext_dm_data_bit | u(1) |
| } | |

Second Example

Changes to Semantics:

ext_block_length[i] is used to derive the size of the i-th extended DM metadata block payload in bytes. ext_block_length[i] is not present if num_ext_blocks is equal to 0. The value of ext_block_length shall be in the range of 0 to 255, inclusive.

In one alternative, the syntax element is coded as ext_block_length_minus1 and the semantics is specified as follows:

ext_block_length_minus1[i] plus 1 [[is used to derive]] specifies the size of the i-th extended DM metadata block payload in bytes. [[ext_block_length[i] is not present if num_ext_blocks is equal to 0.]] The value of ext_block_length_minus1 shall be in the range of 0 to 255, inclusive.

TABLE E.4

Definition of extended DM metadata block type

| ext_block_level | extended DM metadata block type |
|---|---|
| 0 | Reserved |
| 1 | Level 1 Metadata - Content Range |
| 2 | Level 2 Metadata - Trim Pass |
| 3 | Reserved |
| 4 | Reserved |
| 5 | Level 5 Metadata - Active Area |
| <u>6</u> | <u>Level 6 Metadata - Association</u> |
| [[6]]<u>7</u> . . . 255 | Reserved | num_associations specifies the number of associations specified in the ext_dm_data_block_payload. The association block specifies the association between target display characteristics, gamut mapping parameters and active regions associated with the gamut mapping parameters.

num_blocks_in_assoc[i] specifies the number of blocks that are specified in the i-th association. The value of num_blocks_in_assoc[i] shall be in the range of 0 to 255, inclusive.

blk_idx_in_assoc[i][j] specifies the index of the i-th block in the i-th association. The value of blk_idx_in_assoc[i][j] shall be in the range of 0 to num_ext_blocks−1, inclusive.

It is a requirement for bistream conformance that for each block with index k that has ext_block_level value equal to 1, 2 or 5, there shall at least be one value of i in ext_dm_data_block_payload syntax structure with ext_block_level equal to 6 such that blk_idx_in_assoc[i][j] is equal to k.

It is a requirement for bistream conformance that there shall not be more than one ext_dm_data_block_payload syntax structure with ext_block_level equal to 6.

ext_dm_data_bit may have any value. Its presence and value do not affect decoder conformance to profiles specified in this version of this Specification. Decoders conforming to this version of this Specification shall ignore all ext_dm_data_bit syntax elements.

In one alternative, the byte-alignment/future-proof syntax is specified as follows:

| | |
|---|---|
| if(ext_block_level == 1 ‖ ext_block_level == 2 ‖ ext_block_level == 5 ‖ ext_block_level == 6 ) | |
|    [[while( ext_block_use_bits++ < ext_block_len_bits )]] | |
|       [[ext_dm_alignment_zero_bit]] | [[f(1)]] |
|    while( !byte_aligned( ) ) | |
|       ext_dm_alignment_zero_bit | <u>f(1)</u> |
| else | |
|    while( ext_block_use_bits++ < ext_block_len_bits ) | |
|       ext_dm_data_bit | u(1) |
| } | |

Third Example

Changes to Syntax Elements:

TABLE E.1

ST2094-10_data( )

| | Descriptor |
|---|---|
| ST2094-10_data ( ) { | |
|    app_identifier | ue(v) |
|    app_version | ue(v) |
|    metadata_refresh_flag | u(1) |
|    num_ext_blocks | ue(v) |
|    if( num_ext_blocks ) { | |
|       for( i = 0; i < num_ext_blocks; i ++ ) { | |
|          ext_block_length | u(8) |
|          ext_block_level | u(2) |
|          if( ext_block_level == 0 ) { | |
|             min_PQ | u(12) |
|             max_PQ | u(12) |
|             avg_PQ | u(12) |
|          } | |
|          if( ext_block_level == 1 ) { | |
|             target_max_PQ | u(12) |
|             target_min_PQ | u(12) |
|             for (c=0, c<3, c++){ | |
|                display_primaries_x [c] | u(16) |
|                display_primaries_y [c] | u(16) |
|             } | |
|             white_point_x | u(16) |
|             white_point_y | u(16) |

TABLE E.1-continued

| ST2094-10_data( ) | |
|---|---|
| | Descriptor |
| trim_slope | u(12) |
| trim_offset | u(12) |
| trim_power | u(12) |
| trim_chroma_weight | u(12) |
| trim_saturation_gain | u(12) |
| ms_weight_present_flag | u(1) |
| if( ms_weight_present_flag == 1 ) | |
| { | |
|     ms_weight | u(12) |
| } | |
| } | |
| if( ext_block_level == 2 ) { | |
|     active_area_left_offset | u(13) |
|     active_area_right_offset | u(13) |
|     active_area_top_offset | u(13) |
|     active_area_bottom_offset | u(13) |
| } | |
| } | |
| } | |
| } | |

Changes to Semantics:

| Definition of extended display mapping metadata block type | |
|---|---|
| ext_block_level | extended display mapping metadata block type |
| 0 | Level 0 Metadata - Content Range |
| 1 | Level 1 Metadata - Trim Pass |
| 2 | Level 2 Metadata - Active Area |
| 3 | ATSC Reserved | target_min_PQ specifies the minimum luminance value of a target display in 12-bit PQ encoding. The value shall be in the range of 0 to 4095, inclusive. If target_min_PQ is not present, it shall be inferred to be equal to the value of source_min_PQ. The target_min_PQ is the PQ encoded value of TargetedSystemDisplayMinimumLuminance as defined in clause 10.4 of SMPTE ST 2094-1. 10-bit PQ encoding uses the most significant bits.

display_primaries_x[c] and display_primaries_y[c] specify the normalized x and y chromaticity coordinates, respectively, of the colour primary component c of the mastering display in increments of 0.00002, according to the CIE 1931 definition of x and y as specified in ISO 11664-1 (see also ISO 11664-3 and CIE 15). For describing mastering displays that use red, green and blue colour primaries, it is suggested that index value c equal to 0 should correspond to the green primary, c equal to 1 should correspond to the blue primary and c equal to 2 should correspond to the red colour primary (see also Annex E and Table E.3). The values of display_primaries_x[c] and display_primaries_y[c] shall be in the range of 0 to 50000, inclusive.

white_point_x and white_point_y specify the normalized x and y chromaticity coordinates, respectively, of the white point of the mastering display in normalized increments of 0.00002, according to the CIE 1931 definition of x and y as specified in ISO 11664-1 (see also ISO 11664-3 and CIE 15). The values of white_point_x and white_point_y shall be in the range of 0 to 50000.

Fourth Example

Changes to syntax elements and semantics follow. Syntax for the matrices is put in a loop form, as it is a more compact representation.

TABLE E.1

| ST2094-10_type_data( ) | |
|---|---|
| | Descriptor |
| ST2094-10_type_data ( ) { | |
|   affected_dm_metadata_id | ue(v) |
|   current_dm_metadata_id | ue(v) |
|   scene_refresh_flag | ue(v) |
|   YCCtoRGB_coef_present_flag | u(1) |
|   if( YCCtoRGB_coef_present_flag == 1){ | |
|     for(i=0, i<9, i++) | |
|     YCCtoRGB_coef[i] | i(16) |
|   } | |
|   YCCtoRGB_offset_present_flag | u(1) |
|   if( YCCtoRGB_offset_present_flag == 1){ | |
|     for(i=0, i<3, i++) | |
|     YCCtoRGB_offset[i] | u(32) |
|   } | |
|   RGBtoLMS_coef_present_flag | u(1) |
|   if( RGBtoLMS_coef_present_flag == 1){ | |
|     for(i=0, i<9, i++) | |
|     RGBtoLMS_coef[i] | i(16) |
|   } | |
|   st2086_info_present_flag | u(1) |
|   if( st2086_info_present_flag == 1 ){ | |
|     source_min_PQ | u(12) |
|     source_max_PQ | u(12) |
|   } | |
|   source_diagonal | u(10) |
|   num_ext_blocks | ue(v) |
|   if( num_ext_blocks ) { | |
|     while( !byte_aligned( ) ) | |
|       dm_alignment_zero_bit | f(1) |
|     for( i = 0; i < num_ext_blocks; i ++ ) { | |
|       ext_dm_data_block(i) | |
|     } | |
|   } | |
| } | |

TABLE E.3

| ext_dm_data_block_payload( ) | |
|---|---|
| | Descriptor |
| ext_dm_data_block_payload( ext_block_length, ext_block_level ) { | |
|   ext_block_len_bits = 8 * ext_block_length | |
|   ext_block_use_bits = 0 | |
|   if( ext_block_level == 1 ) { | |
|     min_PQ | u(12) |
|     max_PQ | u(12) |
|     avg_PQ | u(12) |
|     ext_block_use_bits += 36 | |
|   } | |
|   if( ext_block_level == 2 ) { | |
|     target_max_PQ | u(12) |
|     target_min_PQ | u(12) |
| for (c=0, c<3, c++){ | |
| display_primaries_x [c] | u(16) |
| display_primaries_y [c] | u(16) |
| } | |
| white_point_x | u(16) |
| white_point_y | u(16) |
|     trim_slope | u(12) |
|     trim_offset | u(12) |
|     trim_power | u(12) |
|     trim_chroma_weight | u(12) |
|     trim_saturation_gain | u(12) |
|     ms_weight | i(13) |
|     ext_block_use_bits += 85 | |
|   } | |
|   if( ext_block_level == 5 ) { | |
|     active_area_left_offset | u(13) |
|     active_area_right_offset | u(13) |

TABLE E.3-continued ext_dm_data_block_payload( )

| | Descriptor |
|---|---|
| active_area_top_offset | u(13) |
| active_area_bottom_offset | u(13) |
| ext_block_use_bits += 52 | |
| } | |
| while( ext_block_use_bits++ < ext_block_len_bits ) | |
| ext_dm_alignment_zero_bit | f(1) |
| } | |

TABLE E.4

Definition of extended DM metadata block type

| ext_block_level | extended DM metadata block type |
|---|---|
| 0 | Forbidden |
| 1 | Level 1 Metadata - Content Range |
| 2 | Level 2 Metadata - Trim Pass |
| 3 | Forbidden |
| 4 | Forbidden |
| 5 | Level 5 Metadata - Active Area |
| 6 ... 255 | Forbidden | target_min_PQ specifies the minimum luminance value of a target display in 12-bit PQ encoding. The value shall be in the range of 0 to 4095, inclusive. If target_min_PQ is not present, it shall be inferred to be equal to the value of source_min_PQ. The target_min_PQ is the PQ encoded value of TargetedSystemDisplayMinimumLuminance as defined in clause 10.4 of SMPTE ST 2094-1[24]. 10-bit PQ encoding uses the most significant bits.

display_primaries_x[c] and display_primaries_y[c] specify the normalized x and y chromaticity coordinates, respectively, of the colour primary component c of the mastering display in increments of 0.00002, according to the CIE 1931 definition of x and y as specified in ISO 11664-1 (see also ISO 11664-3 and CIE 15). For describing mastering displays that use red, green and blue colour primaries, it is suggested that index value c equal to 0 should correspond to the green primary, c equal to 1 should correspond to the blue primary and c equal to 2 should correspond to the red colour primary (see also Annex E and Table E.3). The values of display_primaries_x[c] and display_primaries_y[c] shall be in the range of 0 to 50000, inclusive.

white_point_x and white_point_y specify the normalized x and y chromaticity coordinates, respectively, of the white point of the mastering display in normalized increments of 0.00002, according to the CIE 1931 definition of x and y as specified in ISO 11664-1 (see also ISO 11664-3 and CIE 15). The values of white_point_x and white_point_y shall be in the range of 0 to 50000.

Fifth Example

Changes to Syntax Structures and Semantics:

TABLE E.2 ext_dm_data_block( )

| | Descriptor |
|---|---|
| ext_dm_metadata_block(i) { | |
| ext_block_length[ i ] | [[ue(v)]]u(8) |
| ext_block_level [ i ] | u(8) |
| ext_dm_data_block_payload( ext_block_length[ i ], ext_block_level [ i ] ) | |
| } | |

TABLE E.3 ext_dm_data_block_payload( )

| | Descriptor |
|---|---|
| ext_dm_data_block_payload( ext_block_length, ext_block_level ) { | |
| ext_block_len_bits = 8 * ext_block_length | |
| ext_block_use_bits = 0 | |
| if( ext_block_level == 1 ) { | |
| min_PQ | u(12) |
| max_PQ | u(12) |
| avg_PQ | u(12) |
| ext_block_use_bits += 36 | |
| } | |
| if( ext_block_level == 2 ) { | |
| target_max_PQ | u(12) |
| trim_slope | u(12) |
| trim_offset | u(12) |
| trim_power | u(12) |
| trim_chroma_weight | u(12) |
| trim_saturation_gain | u(12) |
| ms_weight | i(13) |
| ext_block_use_bits += 85 | |
| } | |
| if( ext_block_level == 5 ) { | |
| active_area_left_offset | u(13) |
| active_area_right_offset | u(13) |
| active_area_top_offset | u(13) |
| active_area_bottom_offset | u(13) |
| ext_block_use_bits += 52 | |
| } | |
| if( ext_block_level == 6 ) { | |
| num_associations | u(4) |
| for( i = 0 i < num_associations ; i++ ) { | |
| num_blks_in_assoc[ i ] | u(8) |
| for( j = 0 ; j < num_blks_in_assoc[ i ] ; j++ ) | |
| blk_idx_in_assoc[ i ][ j ] | u(8) |
| ext_block_use_bits += 8* num_blks_in_assoc[ i ] + 8 | |
| } | |
| ext_block_use_bits += 4 | |
| } | |
| if(ext_block_level == 1 || ext_block_level == 2 || ext_block_level == 5 || ext_block_level == 6 ) | |
| while( ext_block_use_bits++ < ext_block_len_bits ) | |
| ext_dm_alignment_zero_bit | f(1) |
| else | |
| while( ext_block_use_bits++ < ext_block_len_bits ) | |
| ext_dm_data_bit | u(1) |
| } | | ext_block_length[i] is used to derive the size of the i-th extended DM metadata block payload in bytes. ext_block_length[i] is not present if num_ext_blocks is equal to 0. The value of ext_block_length shall be in the range of 0 to 255, inclusive.

In one alternative, the syntax element is coded as ext_block_length_minus1 and the semantics is specified as follows:

ext_block_length_minus1[i] plus 1 [[is used to derive]] specifies the size of the i-th extended DM metadata block payload in bytes. [[ext_block_length[i] is not present if num_ext_blocks is equal to 0.]] The value of ext_block_length_minus1 shall be in the range of 0 to 255, inclusive.

TABLE E.4

Definition of extended DM metadata block type

| ext_block_level | extended DM metadata block type |
|---|---|
| 0 | Reserved |
| 1 | Level 1 Metadata - Content Range |
| 2 | Level 2 Metadata - Trim Pass |
| 3 | Reserved |
| 4 | Reserved |
| 5 | Level 5 Metadata - Active Area |
| <u>6</u> | <u>Level 6 Metadata - Association</u> |
| [[6]]<u>7</u> . . . 255 | Reserved | num_associations specifies the number of associations specified for the ext_dm_data_block_payload in the SEI message. The association block specifies the association between scene information, target display characteristics, gamut mapping parameters and active regions associated with the gamut mapping parameters.

num_blocks_in_assoc[i] specifies the number of blocks that are specified in the i-th association. The value of num_blocks_in_assoc[i] shall be in the range of 0 to 255, inclusive.

blk_idx_in_assoc[i][j] specifies the index of the j-th block in the i-th association. The value of blk_idx_in_assoc[i][j] shall be in the range of 0 to num_ext_blocks−1, inclusive.

It is a requirement for bistream conformance that for each block with index k such that has ext_block_level[k] has value equal to 1, 2 or 5, there shall at least be one value of i such that ext_dm_data_block_payload(i) syntax structure with ext_block_level equal to 6 such that blk_idx_in_assoc [i][j] is equal to k.

It is a requirement for bistream conformance that there shall be no more than one ext_dm_data_block_payload syntax structure in the SEI message with ext_block_level equal to 6.

ext_dm_data_bit may have any value. Its presence and value do not affect decoder conformance to profiles specified in this version of this Specification. Decoders conforming to this version of this Specification shall ignore all ext_dm_data_bit syntax elements.

In one alternative, the byte-alignment/future-proof syntax is specified as follows:

```
   if( ext_block_level = = 1 || ext_block_level = = 2 ||
ext_block_level = = 5 || ext_block_level = = 6 )
       [[while( ext_block_use_bits++ <
ext_block_len_bits )]]
           [[ext_dm_alignment_zero_bit]]         [[f(1)]]
           while( !byte_aligned( ) )
               ext_dm_alignment_zero_bit         f(1)
       else
           while( ext_block_use_bits++ <
ext_block_len_bits )
               ext_dm_data_bit                   u(1)
}
```

The following is the text of "ATSC Candidate Standard: A/341 Amendment: 2094-10," which includes amendments to the ATSC document number S34-262r3. This amendment includes some of the methods described above.

1. OVERVIEW

This document describes the encoding and transport in the ATSC emitted bitstream elements of ST 2094-10 "Dynamic Metadata for Color Volume Transform—Application #1" which is a technology for the use of dynamic metadata for HDR content. If approved by the ATSC, A/341:2017, "Video-HEVC," ("A/341") would be amended according to the edits described herein.

2. REFERENCES

The following references would be added to A/341.
2.1 Normative References
[1] SMPTE: "Dynamic Metadata for Color Volume Transformation—Application #1," Doc. ST 2094-10 (2016), Society of Motion Picture and Television Engineer, White Plains, N.Y.
2.2 Informative References
[2] SMPTE: "Dynamic Metadata for Color Volume Transformation—Core Components," Doc. ST 2094-1 (2016), Society of Motion Picture and Television Engineers, White Plains, N.Y.

3. DEFINITION OF TERMS

No new acronyms, abbreviations or terms would be added to A/341.

4. CHANGES TO A/341

In this section of this document, "[ref]" indicates that a cross reference to a cited referenced document that is listed in A/341 would be inserted (or as otherwise described within the square brackets). An actual cross reference to a referenced document listed in this document would be updated with the reference number of the newly added references that would be incorporated into A/341.

Add a Bullet to 6.3.2.2
Add the bullet item below to the bullet list found in 6.3.2.2 "PQ Transfer Characteristics":

The bitstream may contain SEI messages with payload-Type value equal to 4. This allows for the optional transmission of the ST 2094-10 metadata message described in [ref to new subsection described below].

Add a New Subsection Under Section 6.3.2.2
Add the text below to A/341 as a new subsection under Section 6.3.2.2 "PQ Transfer Characteristics." The new subsection is titled Section 6.3.2.2.x "Encoding and Transport of SMPTE ST 2094-10 Metadata Message." (For readability, the following text is not shown in markup.)

Section 6.3.2.2.x "Encoding and Transport of SMPTE ST 2094-10 Metadata Message

The HEVC video bitstream may contain the 2094-10 metadata message in order to provide dynamic information about the HDR video signal. When a 2094-10 metadata message is present, this information can be employed by the display to adapt the delivered HDR imagery to the capability of the display device. Furthermore, this metadata can be used to derive an SDR (ITU-R BT.709 [ref]) picture by receiving devices such as an ATSC 3.0 receiver/converter. The information conveyed in the 2094-10 metadata message defined in [ref to new Annex described below] provides carriage for metadata elements defined in ST 2094-1 [2] and ST 2094-10 [1].

2094-10 metadata, when present, shall be encoded and transported as User data registered by a Recommendation ITU-T T.35 Supplemental Enhancement Information (SEI) message per the ATSC1_data( ) structure defined in Table 14 of ANSI/SCTE 128-1 [ref] and the assigned value for user_data_type_code is shown in [ref to Table x.x].

Table x.x user_data_type_code

TABLE x.x

| user_data_type_code | |
|---|---|
| user_data_type_code | user_data_type_structure |
| 0x09 | ST2094-10_data( ) |

The syntax and semantics for payload ST2094-10_data( ) shall be as specified in [ref to new Annex described below] clause [ref to new Annex, Section 1 described below]. Where present the corresponding NAL unit type shall be set equal to PREFIX_SEI_NUT.

If a 2094-10 metadata message is present, the following constraints shall apply:

The 2094-10 metadata message shall be associated with every access unit of the bitstream. If this message is present, it shall only be present once per access unit.
app_version shall be set equal to 0.
Mastering Display Color Volume SEI messages (containing SMPTE ST 2086 [ref] static metadata) shall be present in the bitstream.
The number of extension blocks with ext_block_level equal to 1 shall be constrained to be equal to 1.
The number of extension blocks with ext_block_level equal to 2 shall be constrained to be less than or equal to 16.
The number of extension blocks with ext_block_level equal to 5 shall be constrained to be equal to 0 or 1.

Add a New Annex to A/341

Add the text below as a new Annex to A/341. The Annex is titled "Metadata Based on SMPTE ST2094-10_Data." (For readability, the following text is not shown in markup.)

A.1 Metadata Based on St 2094-10_Data (Normative)

This clause specifies the syntax and semantics of ST2094-10_data( ).

The syntax for ST2094-10_data( ) is shown in Table Y.Y, Table Z.Z, and Table M.M.

The parsing process of each syntax element by the descriptors f(n), i(n), ue(v) and u(n) is described in HEVC [ref].

Note: The metadata elements are defined according to the SMPTE standards ST2086[ref], ST 2094-1[2], or ST 2094-10 [1]. Conversion between luminancevalues and 12-bit PQ values can be found in ST 2084 Annex A.

TABLE Y.Y

| ST2094-10_data( ) | |
|---|---|
| | Descriptor |
| ST2094-10_data ( ) { | |
|   app_identifier | ue(v) |
|   app_version | ue(v) |
|   metadata_refresh_flag | u(1) |
|   if( metadata_refresh_flag ) { | |
|     num_ext_blocks | ue(v) |
|     if( num_ext_blocks ) { | |
|       while( !byte_aligned( ) ) | |
|         dm_alignment_zero_bit | f(1) |
|       for( i = 0; i < num_ext_blocks; i ++ ) { | |
|         ext_dm_data_block(i) | |
|       } | |
|     } | |
|   } | |
|   while( !byte_aligned( ) ) | |
|     dm_alignment_zero_bit | |
| } | |

TABLE Z.Z

| ext_dm_data_block_payload( ) | |
|---|---|
| | Descriptor |
| ext_dm_metadata_block(i) { | |
|   ext_block_length[ i ] | ue(v) |
|   ext_block_level [ i ] | u(8) |
|   ext_dm_data_block_payload(ext_block_length[ i ], ext_block_level [ i ]) | |
| } | |

Table N.N ext_dm_data_block_payload( )

TABLE N.N

| ext_dm_data_block_payload | |
|---|---|
| | Descriptor |
| ext_dm_data_block_payload( ext_block_length, ext_block_level ) { | |
| ext_block_len_bits = 8 * ext_block_length | |
| ext_block_use_bits = 0 | |
| if( ext_block_level == 1 ) { | |
|   min_PQ | u(12) |
|   max_PQ | u(12) |
|   avg_PQ | u(12) |
|   ext_block_use_bits += 36 | |
| } | |
| if( ext_block_level == 2 ) { | |
|   target_max_PQ | u(12) |
|   trim_slope | u(12) |
|   trim_offset | u(12) |
|   trim_power | u(12) |
|   trim_chroma_weight | u(12) |
|   trim_saturation_gain | u(12) |
|   ms_weight i(13) | |
|   ext_block_use_bits += 85 | |
| } | |
| if( ext_block_level == 5 ) { | |
|   active_area_left_offset | u(13) |
|   active_area_right_offset | u(13) |
|   active_area_top_offset | u(13) |
|   active_area_bottom_offset | u(13) |
|   ext_block_use_bits += 52 | |
| } | |
| while( ext_block_use_bits++ < ext_block_len_bits ) | |
|   ext_dm_alignment_zero_bit f(1) | |
| } | |

This clause defines the semantics for ST2094-10_data( ).

For the purposes of the present clause, the following mathematical functions apply:

$$\text{Abs}(x) = \begin{cases} x; & x \geq 0 \\ -x; & x < 0 \end{cases}$$

Floor(x) is the largest integer less than or equal to x.

$$\text{Sign}(x) = \begin{cases} 1; & x > 0 \\ 0; & x = 0 \\ -1; & x < 0 \end{cases}$$

$$\text{Clip3}(x, y, z) = \begin{cases} x; & z < x \\ y; & z > y \\ z; & \text{otherwise} \end{cases}$$

Round(x) = Sign(x) * Floor(Abs(x) + 0.5)

/=Integer division with truncation of the result toward zero. For example, 7/4 and −7/−4 are truncated to 1 and −7/4 and 7/−4 are truncated to −1.

The precision of the information conveyed in this SEI message is intended to be adequate for purposes corresponding to the use of SMPTE ST 2094-10 [1].

app_identifier identifies an application and is set equal to 1 according to constraints of the section 5 of ST 2094-10 [1].

app_version specifies the application version in the application and is set equal to 0.

metadata_refresh_flag when set equal to 1 cancels the persistence of any previous extended display mapping metadata in output order and indicates that extended display mapping metadata follows. The extended display mapping metadata persists from the coded picture to which the SEI message containing ST2094-10_data( ) is associated (inclusive) to the coded picture to which the next SEI message containing ST2094-10_data( ) and with metadata_refresh_flag set equal to 1 in output order is associated (exclusive) or (otherwise) to the last picture in the CVS (inclusive). When set equal to 0 this flag indicates that the extended display mapping metadata does not follow.

num_ext_blocks specifies the number of extended display mapping metadata blocks. The value shall be in the range of 1 to 254, inclusive.

dm_alignment_zero_bit shall be equal to 0.

ext_block_length[i] is used to derive the size of the i-th extended display mapping metadata block payload in bytes. The value shall be in the range of 0 to 1023, inclusive.

ext_block_level[i] specifies the level of payload contained in the i-th extended display mapping metadata block. The value shall be in the range of 0 to 255, inclusive. The corresponding extended display mapping metadata block types are defined in Table E.1.4. Values of ext_block_level [i] that are ATSC reserved shall not be present in the bitstreams conforming to this version of ATSC specification. Blocks using ATSC reserved values shall be ignored.

When the value of ext_block_level[i] is set equal to 1, the value of ext_block_length[i] shall be set equal to 5.

When the value of ext_block_level[i] is set equal to 2, the value of ext_block_length[i] shall be set equal to 11.

When the value of ext_block_level[i] is set equal to 5, the value of ext_block_length[i] shall be set equal to 7.

TABLE M.M

| ext_block_level | extended display mapping metadata block type |
|---|---|
| 0 | ATSC Reserved |
| 1 | Level 1 Metadata - Content Range |
| 2 | Level 2 Metadata - Trim Pass |
| 3 | ATSC Reserved |
| 4 | ATSC Reserved |
| 5 | Level 5 Metadata - Active Area |
| 6 . . . 255 | ATSC Reserved |

When an extended display mapping metadata block with ext_block_level equal to 5 is present, the following constraints shall apply:

An extended display mapping metadata block with ext_block_level equal to 5 shall be preceded by at least one extended display mapping metadata block with ext_block_level equal to 1 or 2.

Between any two extended display mapping metadata blocks with ext_block_level equal to 5, there shall be at least one extended display mapping metadata block with ext_block_level equal to 1 or 2.

No extended display mapping metadata block with ext_block_level equal to 1 or 2 shall be present after the last extended display mapping metadata block with ext_block_level equal to 5.

The metadata of an extended display mapping metadata block with ext_block_level equal to 1 or 2 shall be applied to the active area specified by the first extended display mapping metadata block with ext_block_level equal to 5 following this block.

When the active area defined by the current extended display mapping metadata block with ext_block_level equal to 5 overlaps with the active area defined by preceding extended display mapping metadata blocks with ext_block_level equal to 5, all metadata of the extended display mapping metadata blocks with ext_block_level equal to 1 or 2 associated with the current extended display mapping metadata block with ext_block_level equal to 5 shall be applied to the pixel values of the overlapping area.

min_PQ specifies the minimum luminance value of the current picture in 12-bit PQ encoding. The value shall be in the range of 0 to 4095, inclusive. Note that the 12-bit min_PQ value is calculated as follows:

min_PQ=Clip3(0,4095,Round(Min*4095))

where Min is MinimumPqencodedMaxrgb as defined in clause 6.1.3 of SMPTE ST 2094-10 [1]

max_PQ specifies the maximum luminance value of current picture in 12-bit PQ encoding. The value shall be in the range of 0 to 4095, inclusive. Note that the 12-bit max_PQ value is calculated as follows:

max_PQ=Clip3(0,4095,Round(Max*4095))

where Max is MaximumPqencodedMaxrgb as defined in clause 6.1.5 of SMPTE ST 2094-10 [1].

avg_PQ specifies the average PQ code value for the luminance of the picture in 12-bit PQ encoding. The value shall be in the range of 0 to 4095, inclusive. Note that the 12-bit avg_PQ value is calculated as follows:

avg_PQ=Clip3(0,4095,Round(Avg*4095))

where Avg is AveragePqencodedMaxrgb as defined in section 6.1.4 of SMPTE ST 2094-10 [1].

target_max_PQ specifies the maximum luminance value of a target display in 12-bit PQ encoding. The value shall be in the range of 0 to 4095, inclusive. The target_max_PQ is the PQ encoded value of TargetedSystemDisplayMaximumLuminance as defined in clause 10.4 of SMPTE ST 2094-1 [2].

Note: This SEI message does not support signaling of TargetedSystemDisplayPrimaries, TargetedSystemDisplayWhitePointChromaticity, and TargetedSystemDisplayMinimumLuminance that are specified as mandatory in ST 2094-10 [1].

If there is more than one extended display mapping metadata block with ext_block_level equal to 2, those blocks shall have no duplicated target_max_PQ.

trim_slope specifies the slope metadata. The value shall be in the range of 0 to 4095, inclusive. If trim_slope is not present, it shall be inferred to be 2048. Note that the 12-bit slope value is calculated as follows:

$$trim\_slope=Clip3(0,4095,Round((SS-0.5)*4096))$$

where S is the ToneMappingGain as defined in clause 6.2.3 of SMPTE ST 2094-10 [1].

trim_offset specifies the offset metadata. The value shall be in the range of 0 to 4095, inclusive. If trim_offset is not present, it shall be inferred to be 2048. Note that the 12-bit offset value is calculated as follows:

$$trim\_offset=Clip3(0,4095,Round((OO+0.5)*4096))$$

where O is the ToneMappingOffset as defined in clause 6.2.2 of SMPTE ST 2094-10 1.

trim_power specifies the power metadata. The value shall be in the range of 0 to 4095, inclusive. If trim_power is not present, it shall be inferred to be 2048. Note that the 12-bit power value is calculated as follows:

$$trim\_power=Clip3(0,4095,Round((PP-0.5)*4096))$$

where P is the ToneMappingGamma as defined in clause 6.2.4 of SMPTE ST 2094-10 [1].

trim_chroma_weight specifies the chroma weight metadata. The value shall be in the range of 0 to 4095, inclusive. If trim_chroma_weight is not present, it shall be inferred to be 2048. Note that the 12-bit chroma weight value is calculated as follows:

$$trim\_chroma\_weight=Clip3(0,4095,Round((CCCC+0.5)*4096))$$

where CW is the ChromaCompensationWeight as defined in clause 6.3.1 of SMPTE ST 2094-10 [1].

trim_saturation_gain specifies the saturation gain metadata. The value shall be in the range of 0 to 4095, inclusive. If trim_saturation_gain is not present, it shall be inferred to be 2048. Note that the 12-bit saturation gain value is calculated as follows:

$$trim\_saturation\_gain=Clip3(0,4095,Round((SSSS+0.5)*4096))$$

where SG is the SaturationGain as defined in clause 6.3.2 of SMPTE ST 2094-10 [1].

ms_weight this field is reserved for future specification. This 13-bit signed integer shall be 0x1fff (−1).

active_area_left_offset, active_area_right_offset, active_area_top_offset, active_area_bottom_offset specify the selected pixels of the current picture, in terms of a rectangular region specified in picture coordinates for the active area. The values shall be in the range of 0 to 8191, inclusive. See also ProcessingWindow of ST 2094-10 [1].

active_area_left_offset, active_area_right_offset, active_area_top_offset, active_area_bottom_offset represent the coordinates of UpperLeftCorner and LowerRightCorner constrained in clause 7.1 of ST 2094-10 [1] as follows:

$$UpperLeftCorner=(active\_area\_left\_offset, active\_area\_top\_offset)$$

$$LowerRightCorner=(XSize-1-active\_area\_right\_offset, YSize-1-active\_area\_bottom\_offset)$$

where Xsize is the horizontal resolution of the current picture and Ysize is the vertical resolution of the current picture.

ext_dm_alignment_zero_bit shall be equal to 0.

Figure 7:
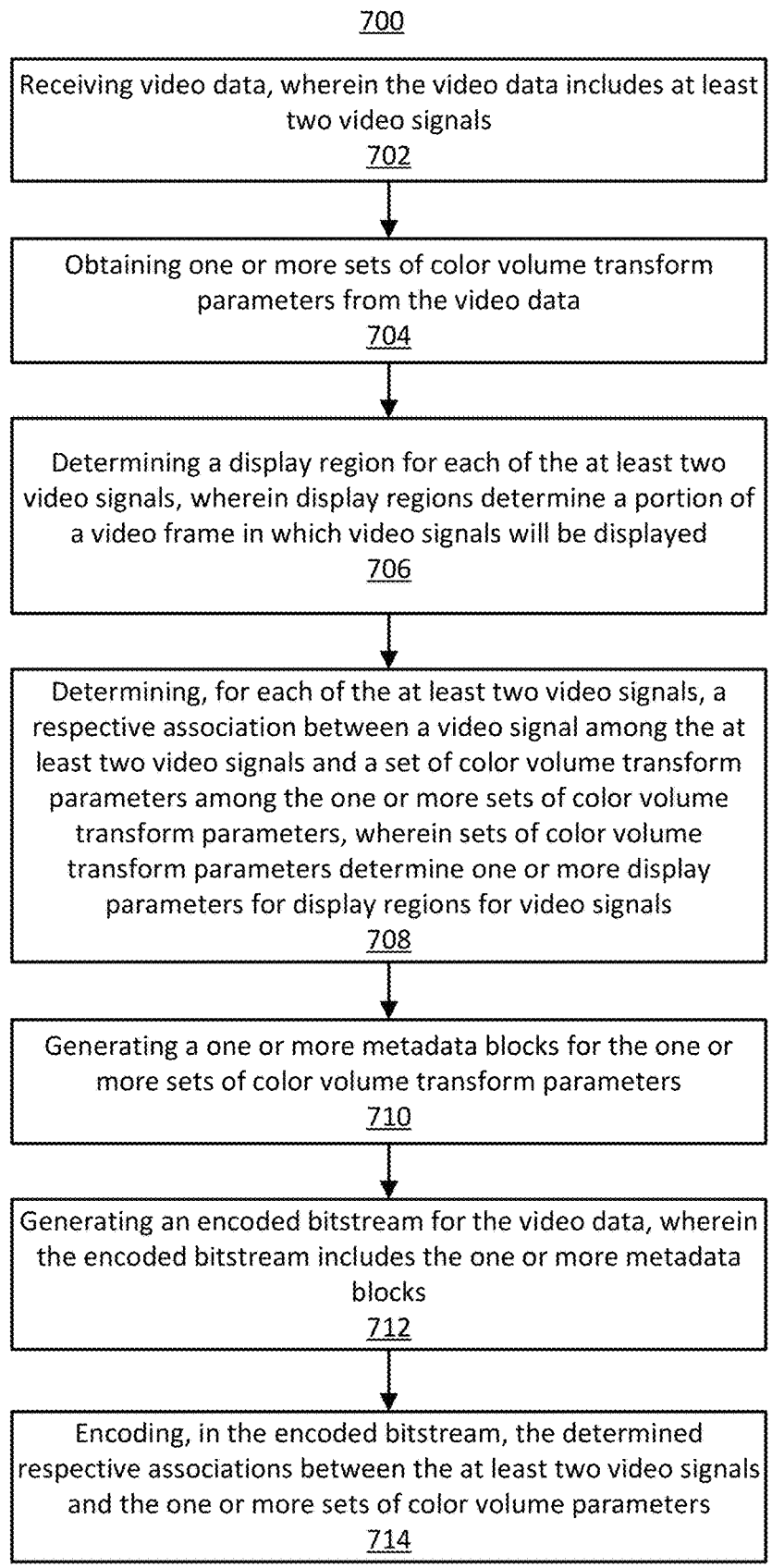
FIG. 7 is an example of a process for processing video data.

FIG. 7 is an example of a process 700 for processing video data. The process 700 can be executed by a video coding system, such as the video coding system of FIG. 1, which is implementing ST 2094-10.

At step 702, the process 700 of FIG. 7 includes receiving the video data, wherein the video data includes at least two video signals. The at least two video signals can be related or unrelated, and/or can be the same or different. For example, each video signal may have been captured by a different camera.

At step 704, the process 700 includes obtaining one or more sets of color volume transform parameters from the video data. As discussed above color volume transform parameters can include a transfer function, as well as variables and constants related to the transfer function. In various implementations, the transfer function, variables, and constants can be used to compact a color volume into a smaller dynamic range.

At step 706, the process 700 includes determining a display region for each of the at least two video signals, wherein display regions determine a portion of a video frame in which video signals will be displayed. In some cases, display regions can be adjacent. In some cases display regions can be overlapping. In some cases, such as with picture-in-picture, a display region can complete overlap with another display region.

At step 708, the process 700 includes determining, for each of the at least two video signals, a respective association between a video signal among the at least two video signals and a set of color volume transform parameters among the one or more sets of color volume transform parameters, wherein sets of color volume transform parameters determine one or more display parameters for display regions for video signals. For example, a set of color volume transform parameters can be used to modify the particular video signal with which the set of color volume transform parameters is associated. In this example, the set of color volume transform parameters can be used to compact the dynamic range of the video signal into a range that is displayable by a particular display device.

At step 710, the process 700 includes generating a one or more metadata blocks for the one or more sets of color volume transform parameters. The metadata blocks can be encoded, for example, in one or more SEI NAL units.

At step 712, the process 700 includes generating an encoded bitstream for the video data, wherein the encoded bitstream includes the one or more metadata blocks. The encoded bitstream can be generated, for example, using the AVC or HEVC standard, or another video coding standard.

At step 714, the process 700 includes encoding, in the encoded bitstream, the determined respective associations between the at least two video signals and the one or more sets of color volume parameters. In some implementations, encoding the associations can include placing the one or more metadata blocks in the encoded bitstream according to an order of the display regions within the video frame. For example, the one or more metadata blocks that contain the set of color volume transform parameters for the first (in raster order) display region can be placed in the encoded bitstream, then the metadata blocks that contain the set of color volume transform parameters for the second (in raster order) display region can be placed in the encoded bitstream next, and so on.

In some implementations, encoding the determined associations between the at least two video signals and the one or more sets of color volume parameters can include inserting one or more values into the encoded bitstream that each indicate the determined associations. For example, a data structure can be encoded into the bitstream, where the data structure indicates an association between a set of color volume parameters encoded in a particular set of metadata blocks and a display region.

In some cases, a first display region for a first video signal from the at least two video signals overlaps with a second display region for a second video signal from the at least two video signals. In these cases, a set of color volume transform parameters from the one or more sets of color volume transform parameters to use in the overlapping region is determined by a priority between the first display region and the second display region. In some examples, the priority is based on an order in which the first display region and the second display region are displayed in the video frame. In some examples, the priority is based on a value provided by the video data. For example, a priority value can be encoded into the bitstream with each display region.

Figure 8:
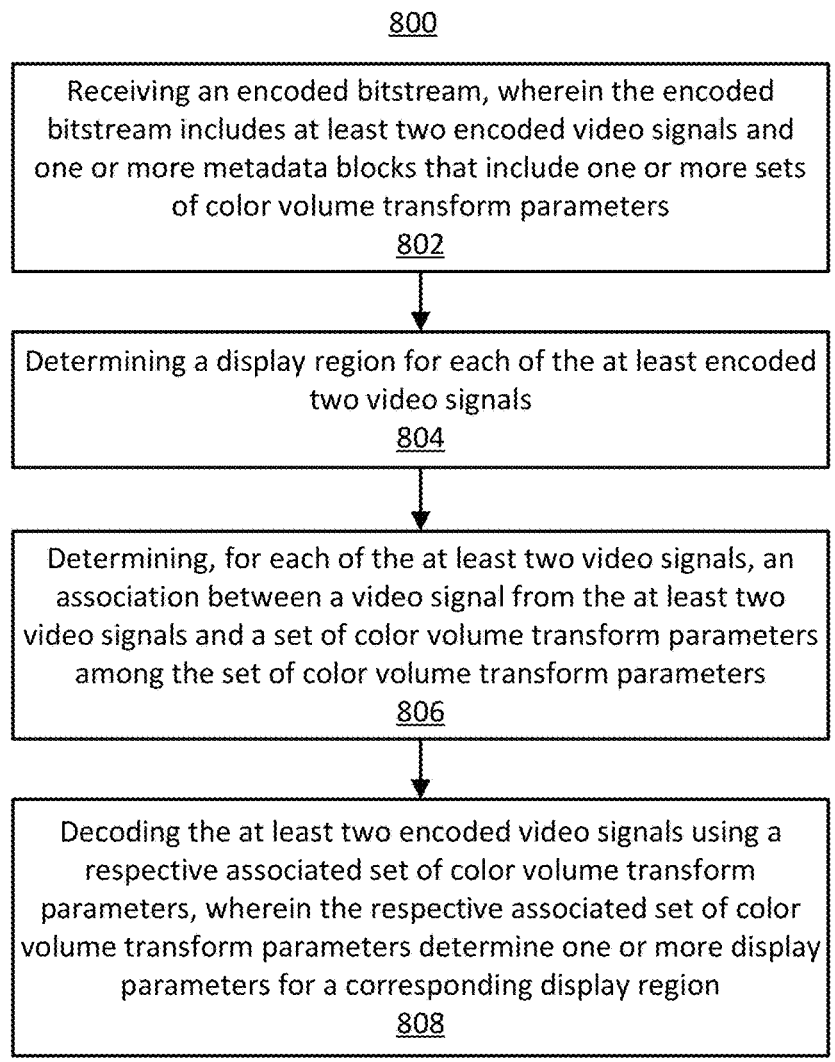
FIG. 8 is an example of a process for processing video data.

FIG. 8 is an example of a process 800 for processing video data. The process 800 can be implemented by a video coding system that implements ST 2094-10.

At step 802, the process 800 includes receiving an encoded bitstream, wherein the encoded bitstream includes at least two encoded video signals and one or more metadata blocks that include one or more sets of color volume transform parameters. The at least two video signals can be related or unrelated, and/or can be the same or different. For example, each video signal may have been captured by a different camera. The sets of color volume transform parameters can include, for example, a transfer function and variables and/or constants related to the transfer function. The one or more metadata blocks can be, for example, encoded in one or more SEI NAL units in the encoded bitstream.

At step 804, the process 800 includes determining a display region for each of the at least encoded two video signals. Each display region can correspond to an area of a screen of a display device (e.g., a monitor, smartphone screen, tablet screen, etc.). Each video signal can be displayed in an individual (or possibly multiple individual) display regions.

At step 806, the process 800 includes determining, for each of the at least two video signals, an association between a video signal among the at least two video signals and a set of color volume transform parameters among the set of color volume transform parameters.

At step 808, the process 800 includes decoding the at least two encoded video signals using a respective associated set of color volume transform parameters, wherein the respective associated set of color volume transform parameters determine one or more display parameters for a corresponding display region. For example, a set of color volume transform parameters can be used to compact the dynamic range of a video signal into a range that can be displayed by a particular display device.

In some implementations, associations between the at least two video signals and the one or more set of color volume transform parameters is based on an order of the display regions. For example, a set of color volume transform parameters that appears first in the encoded bitstream can be associated with a first (in raster order) display region.

In some implementations, associations between the at least two video signals and the one or more set of color volume transform parameters is based on one or more values included in the encoded bitstream. For example, a data structure can be encoded into the bitstream, where the data structure includes values that associate a set of color volume transform parameters with a particular display region.

In some cases, a first display region for a first video signal from the at least two video signals overlaps with a second display region for a second video signal from the at least two video signals. In these cases, a set of color volume transform parameters from the one or more sets of color volume transform parameters to use in the overlapping region is determined by a priority between the first display region and the second display region. For example, the priority can be based on an order in which the first display region and the second display region are displayed in the video frame. As another example, the priority can be based on a value provided by the video data.

FIG. 9 is an example of a process 900 for processing video data. The process 900 can be implemented by a video coding system that includes ST 2094-10.

At step 902, the process 900 includes receiving the video data, wherein the video data is associated with a color volume. As discussed above, a color volume can include at least dynamic range and a color gamut, which the depth and range of colors captured in the video data.

At step 904, the process 900 includes obtaining a set of color volume transform parameters from the video data, wherein the set of color volume transform parameters can be used to transform the color volume. For example, the set of color volume transform parameters can include a transfer function, variables, and constants. As a further example, the color volume transform parameters can be used to compact the dynamic range of the color volume to a range that can be displayed by a particular display device.

At step 906, the process 900 includes obtaining a set of mastering display color volume parameters, wherein the set of mastering display color volume parameters includes values determined when generating a master copy of the video data. The mastering display color volume parameters can reflect, for example, a depth and range of colors that the person who made the video data desired. In some examples, it is desirable for any copies of the video data to, as near as possible, be displayed using the depth and range of colors captured by the mastering display color volume parameters.

At step 908, the process 900 includes generating one or more metadata blocks for the set of color volume transform parameters. The one or more metadata blocks can be encoded, for example, into one or more SEI NAL units.

At step 910, the process 900 includes generating one or more additional metadata blocks for the set of mastering display color volume parameters. In various examples, metadata blocks for the mastering display color volume parameters can also be encoded in SEI NAL units.

At step 912, the process 900 includes generating an encoded bitstream for the video data, wherein the encoded bitstream includes the one or more metadata blocks and the one or more additional metadata blocks, wherein inclusion of the one or more additional metadata blocks is required by presence of the one or more metadata blocks in the encoded bitstream.

In some examples, the set of color volume transform parameters includes a transfer characteristic, and wherein, in the encoded bitstream, the one or more metadata blocks are excluded when the transfer characteristic does not correspond to a particular value. For example, the transfer characteristic has a value of 16 when the transfer function from ST 2084 is included in the set of color volume transform parameters, and has a value of 18 when transfer function from HLG is include. In these examples, one or more metadata blocks are not included in the bitstream when the transfer function has neither a value of 16 or 18.

In some examples, the set of color volume transform parameters and the set of mastering display color volume parameters include a same field. In these examples, the field is omitted from the one or more metadata blocks for the set of color volume transform parameters based on the field being present in the one or more additional metadata blocks for the mastering display color volume parameters.

In some examples, the video data includes a plurality of processing windows. In some implementations, in the encoded bitstream, a quantity of the plurality of processing windows is constrained to a value between one and sixteen. This constraint set expectations for decoders, such that decoders can expect no more than sixteen processing windows in an encoded bitstream. Similarly, in some examples, the video data includes a plurality of content description elements, and wherein, in the encoded bitstream, a quantity of the plurality of content description elements is constrained to one. In some examples, the video data includes a plurality of target display elements, and wherein, in the encoded bitstream, a quantity of the plurality of target display elements is constrained to a value between one and sixteen. These constraints can limit the range of options that a decoder is expected to be able to handle.

In some examples, an encoded bitstream can include at least one metadata block for each access unit in the encoded bitstream, the metadata block including color volume transform parameters. That is, for each access unit, the encoded bitstream will include at least one metadata block that includes color volume transform parameters.

In some examples, values defined as reserved are excluded from the encoded bitstream. For example, reserved values for an ext_block_level field of a metadata block (where the metadata block includes color volume transform parameters) can be excluded from an encoded bitstream.

In some implementations, the one or more metadata blocks for the color volume transform parameters each include a length value. In some examples, in the encoded bitstream, the length value is constrained to a multiple of eight. In some examples, the length value is constrained to a value between 0 and 255.

Figure 10:
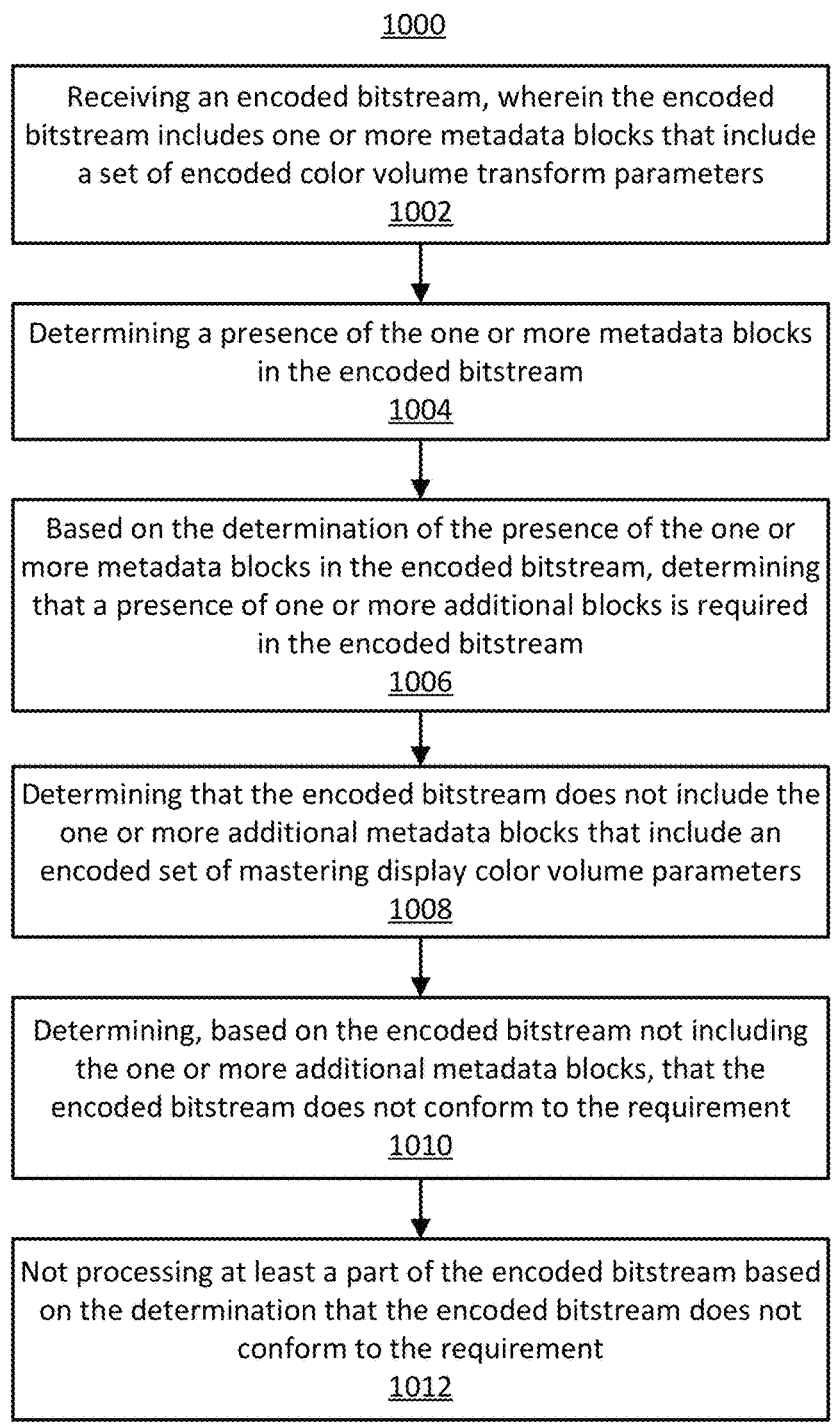
FIG. 10 is an example of a process for processing video data.

FIG. 10 is an example of a process 1000 for processing video data. The process 1000 can be implemented by a video coding system that implements ST 2094-10.

At step 1002, the process 1000 includes receiving an encoded bitstream, wherein the encoded bitstream includes one or more metadata blocks that include a set of encoded color volume transform parameters. The color volume parameters can be used to reduce the dynamic range of video data included in the encoded bitstream, so that the video data can be displayed by a particular display device. In some examples, the metadata blocks are encoded in one or more SEI NAL units in the encoded bitstream.

At step 1004, the process 1000 includes determining a presence of the one or more metadata blocks in the encoded bitstream.

At step 1006, the process 1000 includes, based on the determination of the presence of the one or more metadata blocks in the encoded bitstream, determining that a presence of one or more additional blocks is required in the encoded bitstream.

At step 1008, the process 1000 includes determining that the encoded bitstream does not include the one or more additional metadata blocks that include an encoded set of mastering display color volume parameters. In some implementations, presence, in the encoded bitstream, of the metadata blocks that include the set of encoded color volume transform parameters means that metadata blocks that include mastering display color volume parameters should also be present in the encoded bitstream. The additional metadata blocks could otherwise be encoded in one or more SEI NAL units in the encoded bitstream.

At step 1010, the process 1000 includes determining, based on the encoded bitstream not including the one or more additional metadata blocks, that the encoded bitstream does not conform to the requirement. A conforming bitstream is one that adheres to agreed-upon standards. A non-conforming bitstream may not be parse-able and/or playable by decoders that are compliant with the standards.

At step 1012, the process 100 includes not processing at least a part of the encoded bitstream based on the determination that the encoded bitstream does not conform to the requirement. Not processing a part of the bitstream can mean, for example, that the metadata blocks that include color volume transform parameters (e.g., SEI NAL units that contain the parameters) are not parsed, decoded, and/or otherwise used. Alternatively or additionally, not processing part of the bitstream can mean, for example, not processing (e.g. decoding and/or displaying) video data that is associated with the color volume transform parameters. Alternatively or additionally, not processing a part of the bitstream can mean not decoding or displaying the entire bitstream.

In some implementations, an encoded set of color volume transform parameters include a transfer characteristic. In these implementations, the process 1000 further includes determining that a value of the transfer characteristic is particular value, such as a value indicating that the ST 2084 transfer function is included in the bitstream or a value indicating that the HLG transfer function is included in the bitstream. In these implementations, the encoded bitstream is non-conforming because the one or more metadata blocks are included in the encoded bitstream and the value of the transfer characteristic is a particular value.

In some cases, the encoded set of color volume transform parameters and the encoded the set of mastering display color volume parameters include a same field. In these cases, determining that the encoded bitstream is non-conforming is further based on the field being present in both the one or more metadata blocks and the one or more additional metadata blocks.

In some cases, the encoded set of color volume transform parameters and the encoded the set of mastering display color volume parameters include a same field, and the field is omitted from the one or more metadata blocks. In these cases, when decoding the set of color volume parameters, decoding uses a value for the field from the encoded set of mastering display color volume parameters.

In some cases, the video data being processed includes a plurality of processing windows. In these cases, determining that the encoded bitstream is non-conforming may be further based on a quantity of the plurality of processing windows being greater than sixteen.

In some cases, the video data includes a plurality of content description elements. In these cases, determining that the encoded bitstream is non-conforming may be further based on a quantity of the plurality of content description elements being greater than one.

In some cases, the video data includes a plurality target display elements. In these cases, determining that the encoded bitstream is non-conforming may be further based on a quantity of the plurality of target display elements being greater than sixteen.

In some implementations, the process 1000 can further include determining that the encoded bitstream does not include a metadata block for a particular access unit in the encoded bitstream. In these implementations, determining that the encoded bitstream is non-conforming may be further based the encoded bitstream not including a metadata block for the particular access unit.

In some implementations, the process 1000 can further include determining that the encoded bitstream includes a reserved value. In these implementations, determining that the encoded bitstream is non-conforming may be further based on the encoded bitstream including a reserved value.

In some implementations, the one or more metadata blocks each include a length value. In these cases, determining that the encoded bitstream is non-conforming may be further based on the length value not being a multiple of eight. In some cases, determining that the encoded bitstream is non-conforming may be further based on the length value being greater than 255.

The methods and operations discussed herein may be implemented using compressed video, and may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 11:
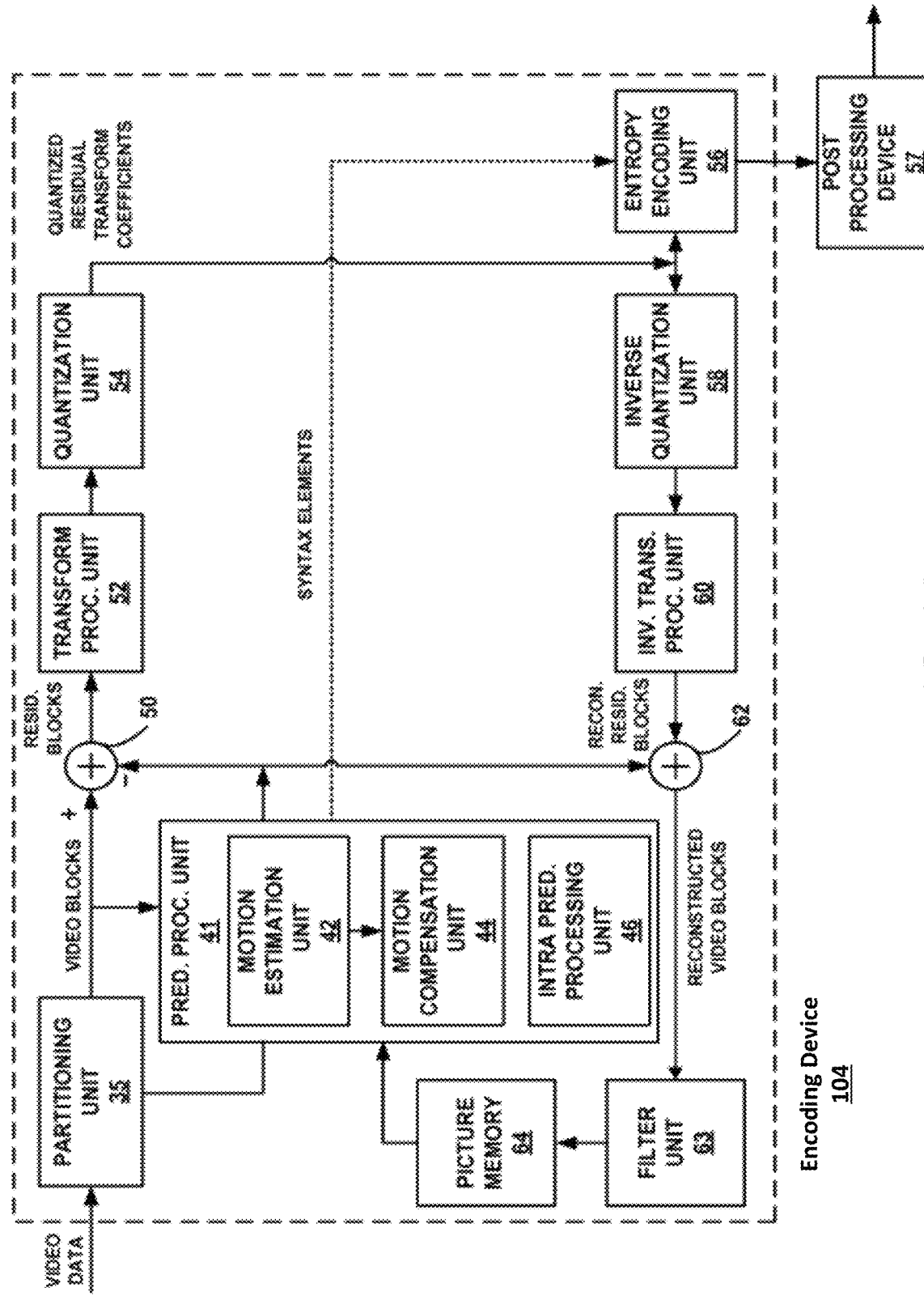
FIG. 11 is a block diagram illustrating an example encoding device.
Figure 12:
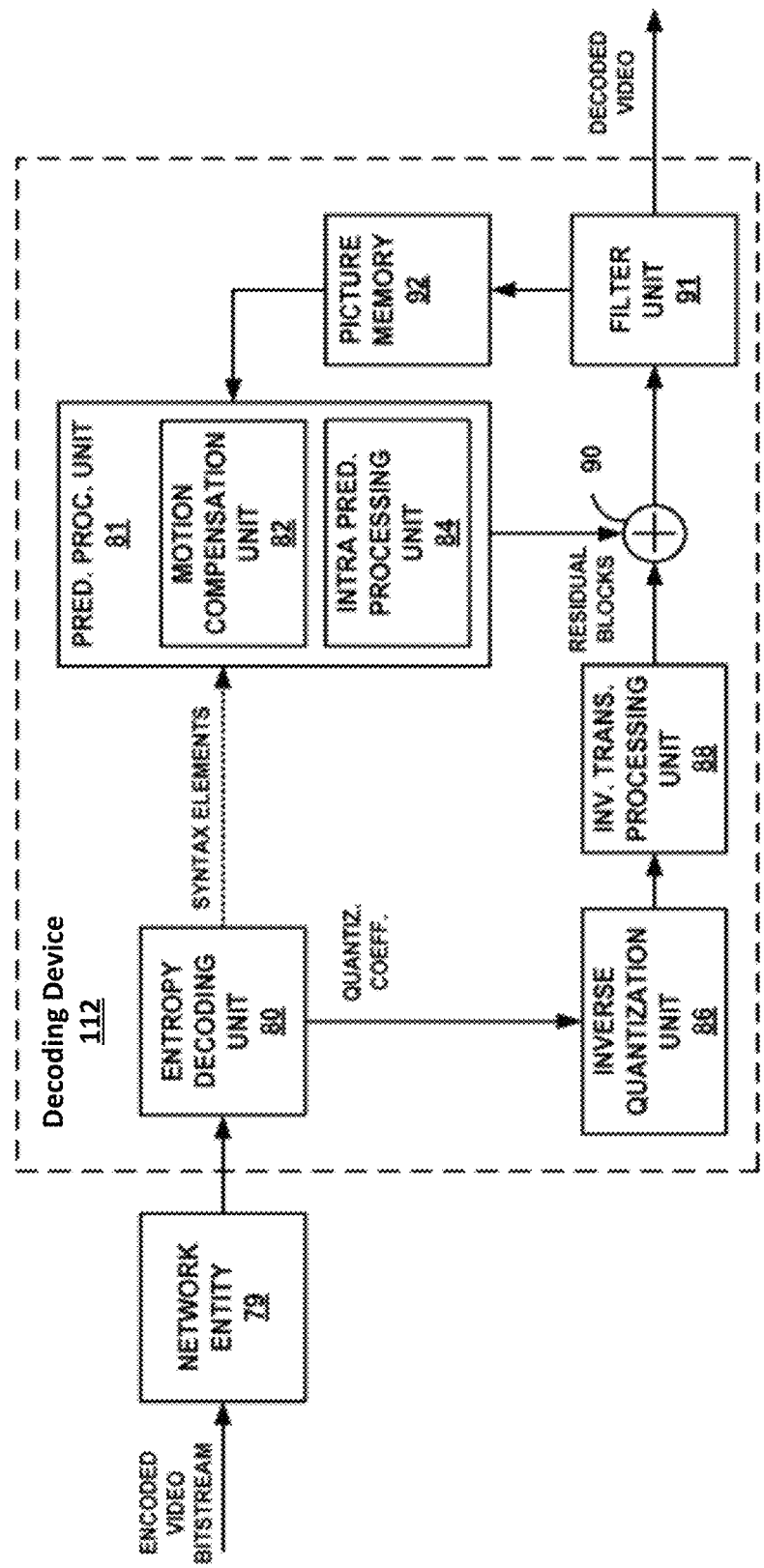
FIG. 12 is a block diagram illustrating an example decoding device.

Specific details of the encoding device 104 and the decoding device 112 are shown in FIG. 11 and FIG. 12, respectively. FIG. 11 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 11 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 11, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The ncoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 11 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above with respect to FIGS. 7 and 8. The techniques of this disclosure have generally been described with respect to the encoding device 104, but as mentioned above, some of the techniques of this disclosure may also be implemented by post processing device 57.

FIG. 12 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 16.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 12 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for processing video data, comprising:

receiving first video data and second video data, wherein the first video data is associated with a first color volume and the second video data is associated with a second color volume;

obtaining a first set of color volume transform parameters associated with the first video data, the first set of color volume transform parameters including a first transfer characteristic associated with a first transfer function, wherein the first set of color volume transform parameters can be used to transform the first color volume associated with the first video data according to the first transfer function;

obtaining a second set of color volume transform parameters associated with the second video data, the second set of color volume transform parameters including a second transfer characteristic associated with a second transfer function, wherein the second set of color volume transform parameters can be used to transform the second color volume associated with the second video data according to the second transfer function;

obtaining a set of mastering display color volume parameters, wherein the set of mastering display color volume parameters includes values determined based on generation of a master copy of the first video data; and generating an encoded bitstream for the first video data, wherein generating the encoded bitstream comprises:

determining whether a first value associated with the first transfer characteristic of the first set of color volume transform parameters is a value of 16 associated with a Perceptual Quantizer (PQ) transfer function;

responsive to a determination that the first value associated with the first transfer characteristic of the first set of color volume transform parameters is the value of 16 associated with the PQ transfer function, generating at least one Society of Motion Picture and Television Engineers (SMPTE) ST 2094-10 metadata block for the first set of color volume transform parameters and including, in a first message of the encoded bitstream, the at least one SMPTE ST 2094-10 metadata block for the first set of color volume transform parameters, the at least one SMPTE ST 2094-10 metadata block including at least a length value indicating a length of the at least one SMPTE ST 2094-10 metadata block, a payload value indicating a level of payload included in the at least one SMPTE ST 2094-10 metadata block, and payload data corresponding to the level of payload; and responsive to a determination that the at least one SMPTE ST 2094-10 metadata block for the first set of color volume transform parameters was included within the first message of the encoded bitstream, including, in the encoded bitstream, one or more metadata blocks for the set of mastering display color volume parameters based on a constraint indicating that one or more mastering display color volume messages shall be present in the encoded bitstream when one or more SMPTE ST 2094-10 metadata blocks are included in the encoded bitstream;

determining whether a second value associated with the second transfer characteristic of the second set of color volume transform parameters is the value of 16 associated with the PQ transfer function; and responsive to a determination that the second value associated with the second transfer characteristic of the second set of color volume transform parameters is a value other than the value of 16 associated with the PQ transfer function, determining not to generate any SMPTE ST 2094-10 metadata blocks for the second set of color volume transform parameters.

2. The method of claim 1, further comprising:
determining that the first set of color volume transform parameters and the set of mastering display color volume parameters include a same field; and
omitting the field from the at least one metadata block for the first set of color volume transform parameters based on the field being present in the one or more metadata blocks for the set of mastering display color volume parameters.

3. The method of claim 1, wherein the first video data includes a plurality of processing windows, each processing window describing a respective portion of a display, the method further comprising constraining a number of processing windows included within the encoded bitstream to be a value between one and sixteen.

4. The method of claim 1, wherein the first video data includes a plurality of content description elements, each content description element providing information associated with a video signal, the method further comprising constraining a number content description elements to be a value of one.

5. The method of claim 1, wherein the first video data includes a plurality of target display elements, each target display element providing information associated with a display device configured to render a particular video signal, the method further comprising constraining a number of target display elements to be a value between one and sixteen.

6. The method of claim 1, further comprising, including, in the encoded bitstream, the at least one SMPTE ST 2094-10 metadata block for each access unit in the encoded bitstream.

7. The method of claim 1, wherein values defined as reserved are excluded from the encoded bitstream.

8. The method of claim 1, further comprising constraining the length value to be a multiple of eight.

9. The method of claim 1, further comprising constraining the length value to be a value between 0 and 255.

10. The method of claim 1, further comprising encoding the at least one SMPTE ST 2094-10 metadata block in at least one Supplemental Enhancement Information (SEI) Network Abstraction Layer (NAL) unit.

11. The method of claim 1, further comprising encoding the one or more metadata blocks for the set of mastering display color volume parameters in at least one Supplemental Enhancement Information (SEI) Network Abstraction Layer (NAL) unit.

12. An apparatus for processing video data, comprising:
a memory configured to store video data, wherein the video data is associated with a color volume; and
a processor implemented in circuitry and configured to:
obtain a set of color volume transform parameters associated with the video data, the set of color volume transform parameters including a transfer characteristic associated with a transfer function, wherein the set of color volume transform parameters can be used to transform the color volume associated with the video data according to the transfer function;
obtain a set of mastering display color volume parameters, wherein the set of mastering display color volume parameters includes values determined based on generation of a master copy of the video data; and
generate an encoded bitstream for the video data, such that the processor is further configured to:
determine whether a value associated with the transfer characteristic of the set of color volume transform parameters is a value of 16 associated with a Perceptual Quantizer (PQ) transfer function;
responsive to a determination that the value associated with the transfer characteristic of the set of color volume transform parameters is the value of 16 associated with the PQ transfer function, generate at least one Society of Motion Picture and Television Engineers (SMPTE) ST 2094-10 metadata block for the set of color volume transform parameters and including, in a message of the encoded bitstream, the at least one SMPTE ST 2094-10 metadata block for the set of color volume transform parameters, the at least one SMPTE ST 2094-10 metadata block including at least a length value indicating a length of the at least one SMPTE ST 2094-10 metadata block, a payload value indicating a level of payload included in the at least one SMPTE ST 2094-10 metadata block, and payload data corresponding to the level of payload;
responsive to a determination that the value associated with the transfer characteristic of the set of color volume transform parameters is a value other than the value of 16 associated with the PQ transfer function, determine not to generate any SMPTE ST 2094-10 metadata blocks for the second set of color volume transform parameters; and
responsive to a determination that the at least one SMPTE ST 2094-10 metadata block for the set of color volume transform parameters was included within the message of the encoded bitstream, include, in the encoded bitstream, one or more metadata blocks for the set of mastering display color volume parameters based on a constraint indicating that one or more mastering display color volume messages shall be present in the encoded bitstream when one or more SMPTE ST 2094-10 metadata blocks are included in the encoded bitstream.

13. A non-transitory computer-readable medium having stored thereon instructions that, when executed by one or more processors, cause the one or more processors to:

receive first video data and second video data, wherein the first video data is associated with a first color volume and the second video data is associated with a second color volume;

obtain a first set of color volume transform parameters associated with the first video data, the first set of color volume transform parameters including a first transfer characteristic associated with a first transfer function, wherein the first set of color volume transform parameters can be used to transform the first color volume associated with the first video data according to the first transfer function;

obtain a second set of color volume transform parameters associated with the second video data, the second set of color volume transform parameters including a second transfer characteristic associated with a second transfer function, wherein the second set of color volume transform parameters can be used to transform the second color volume associated with the second video data according to the second transfer function;

obtain a set of mastering display color volume parameters, wherein the set of mastering display color volume parameters includes values determined based on generation of a master copy of the first video data; and generate an encoded bitstream for the first video data, wherein the non-transitory computer-readable medium comprises further instructions that cause the one or more processors to:

determine whether a first value associated with the first transfer characteristic of the first set of color volume transform parameters is a value of 16 associated with a Perceptual Quantizer (PQ) transfer function;

responsive to a determination that the first value associated with the first transfer characteristic of the first set of color volume transform parameters is the value of 16 associated with the PQ transfer function, generating at least one Society of Motion Picture and Television Engineers (SMPTE) ST 2094-10 metadata block for the first set of color volume transform parameters and including, in a first message of the encoded bitstream, the at least one SMPTE ST 2094-10 metadata block for the first set of color volume transform parameters, the at least one SMPTE ST 2094-10 metadata block including at least a value indicating a length of the at least one SMPTE ST 2094-10 metadata block, a value indicating a level of payload included in the at least one SMPTE ST 2094-10 metadata block, and payload data corresponding to the level of payload; and responsive to a determination that the at least one SMPTE ST 2094-10 metadata block for the first set of color volume transform parameters was included within the first message of the encoded bitstream, including, in the encoded bitstream, one or more metadata blocks for the set of mastering display color volume parameters based on a constraint indicating that one or more mastering display color volume messages shall be present in the encoded bitstream when one or more SMPTE ST 2094-10 metadata blocks are included in the encoded bitstream;

determine whether a second value associated with the second transfer characteristic of the second set of color volume transform parameters is the value of 16 associated with the PQ transfer function; and responsive to a determination that the second value associated with the second transfer characteristic of the second set of color volume transform parameters is a value other than the value of 16 associated with the PQ transfer function, determining not to generate any SMPTE ST 2094-10 metadata blocks for the second set of color volume transform parameters.

14. The apparatus of claim 12, wherein the processor is further configured to:
determine that the set of color volume transform parameters and the set of mastering display color volume parameters include a same field; and
omit the field from the at least one metadata block for the set of color volume transform parameters based on the field being present in the one or more metadata blocks for the set of mastering display color volume parameters.

15. The apparatus of claim 12, wherein the video data includes a plurality of processing windows, each processing window describing a respective portion of a display, and wherein the processor is further configured to constrain a number of processing windows included within the encoded bitstream to be a value between one and sixteen.

16. The apparatus of claim 12, wherein the video data includes a plurality of content description elements, each content description element providing information associated with a video signal, and wherein the processor is further configured to constrain a number content description elements to be a value of one.

17. The apparatus of claim 12, wherein the video data includes a plurality of target display elements, each target display element providing information associated with a display device configured to render a particular video signal, and wherein the processor is further configured to constrain a number of target display elements to be a value between one and sixteen.

18. The apparatus of claim 12, wherein the processor is further configured to, include, in the encoded bitstream, the at least one SMPTE ST 2094-10 metadata block for each access unit in the encoded bitstream.

19. The apparatus of claim 12, wherein the processor is further configured to exclude values defined as reserved from the encoded bitstream.

20. The apparatus of claim 12, wherein the processor is further configured to constrain the length value to be a multiple of eight.

21. The apparatus of claim 12, wherein the processor is further configured to constrain the length value to be a value between 0 and 255.

22. The apparatus of claim 12, wherein the processor is further configured to encode the at least one SMPTE ST 2094-10 metadata block in at least one Supplemental Enhancement Information (SEI) Network Abstraction Layer (NAL) unit.

23. The apparatus of claim 12, wherein the processor is further configured to encode the one or more metadata blocks for the set of mastering display color volume parameters in at least one Supplemental Enhancement Information (SEI) Network Abstraction Layer (NAL) unit.

24. The non-transitory computer-readable medium of claim 13, further comprising instructions that, when executed, cause the one or more processors:
determine that the first set of color volume transform parameters and the set of mastering display color volume parameters include a same field; and
omit the field from the at least one metadata block for the first set of color volume transform parameters based on the field being present in the one or more metadata blocks for the set of mastering display color volume parameters.

25. The non-transitory computer-readable medium of claim 13, wherein the first video data includes a plurality of processing windows, each processing window describing a respective portion of a display, and wherein the non-transitory computer-readable medium comprises further instructions that cause the one or more processors to constrain a number of processing windows included within the encoded bitstream to be a value between one and sixteen.

26. The non-transitory computer-readable medium of claim 13, wherein the first video data includes a plurality of content description elements, each content description element providing information associated with a video signal, and wherein the non-transitory computer-readable medium comprises further instructions that cause the one or more processors to constrain a number content description elements to be a value of one.

27. The non-transitory computer-readable medium of claim 13, wherein the first video data includes a plurality of target display elements, each target display element providing information associated with a display device configured to render a particular video signal, and wherein the non-transitory computer-readable medium comprises further instructions that cause the one or more processors to constrain a number of target display elements to be a value between one and sixteen.

28. The non-transitory computer-readable medium of claim 13, further comprising instructions that, when executed, cause the one or more processors to, include, in the encoded bitstream, the at least one SMPTE ST 2094-10 metadata block for each access unit in the encoded bitstream.

29. The non-transitory computer-readable medium of claim 13, further comprising instructions that, when executed, cause the one or more processors to constrain the length value to be a multiple of eight.

30. The non-transitory computer-readable medium of claim 13, further comprising instructions that, when executed, cause the one or more processors to constrain the length value to be a value between 0 and 255.

31. The non-transitory computer-readable medium of claim 13, further comprising instructions that, when executed, cause the one or more processors to encode the one or more metadata blocks for the set of mastering display color volume parameters in at least one Supplemental Enhancement Information (SEI) Network Abstraction Layer (NAL) unit.

32. The method of claim 1, wherein the first message is a supplemental information enhancement (SEI) message.

33. The apparatus of claim 12, wherein the message is a supplemental information enhancement (SEI) message.

34. The non-transitory computer-readable medium of claim 13, wherein the first message is a supplemental information enhancement (SEI) message.

* * * * *